United States Patent
Drumm et al.

(10) Patent No.: US 11,175,767 B2
(45) Date of Patent: Nov. 16, 2021

(54) UNWANTED TOUCH MANAGEMENT IN TOUCH-SENSITIVE DEVICES

(71) Applicant: Beechrock Limited, Castletown (IM)

(72) Inventors: Owen Drumm, Dublin (IE); Niall O'Cleirigh, San Mateo, CA (US)

(73) Assignee: Beechrock Limited, Castletown (IM)

( * ) Notice: Subject to any disclaimer, the term of this patent is extended or adjusted under 35 U.S.C. 154(b) by 0 days.

(21) Appl. No.: 16/279,880

(22) Filed: Feb. 19, 2019

(65) Prior Publication Data

US 2019/0258353 A1 Aug. 22, 2019

Related U.S. Application Data

(60) Provisional application No. 62/632,140, filed on Feb. 19, 2018.

(51) Int. Cl.
*G06F 3/041* (2006.01)
*G06F 3/042* (2006.01)

(52) U.S. Cl.
CPC .......... *G06F 3/0416* (2013.01); *G06F 3/0421* (2013.01); *G06F 3/04186* (2019.05); *G06F 2203/04109* (2013.01)

(58) Field of Classification Search
CPC .. G06F 3/0416; G06F 3/04186; G06F 3/0421; G06F 2203/04109
See application file for complete search history.

(56) References Cited

U.S. PATENT DOCUMENTS

| | | | |
|---|---|---|---|
| 8,227,742 B2 | 7/2012 | Drumm | |
| 8,350,831 B2 | 1/2013 | Drumm | |
| 9,092,092 B2 | 7/2015 | Drumm | |
| 9,170,683 B2 | 10/2015 | Drumm | |
| 9,778,789 B2* | 10/2017 | Westerman | G06F 3/04186 |
| 9,819,976 B2 | 11/2017 | Tsukagoshi | |
| 2009/0095540 A1* | 4/2009 | Zachut | G06F 3/04186 178/18.03 |
| 2012/0218229 A1 | 8/2012 | Drumm | |
| 2012/0262407 A1 | 10/2012 | Hinckley et al. | |
| 2014/0168142 A1 | 6/2014 | Sasselli et al. | |

(Continued)

FOREIGN PATENT DOCUMENTS

EP 2843516 A2 * 3/2015 ........... G06F 3/0412

OTHER PUBLICATIONS

PCT International Search Report and Written Opinion, PCT Application No. PCT/IB2019/000182, dated Jul. 9, 2019, 24 pages.

*Primary Examiner* — Stacy Khoo
(74) *Attorney, Agent, or Firm* — Fenwick & West LLP

(57) ABSTRACT

An optical touch-sensitive device is able to determine the locations of multiple simultaneous touch events on a surface. The optical touch-sensitive device includes multiple emitters and detectors. Each emitter produces optical beams which are received by the detectors. Touch events on the surface disturb the optical beams received by the detectors. Based on the disturbed beams, a map of the touch activity on the surface is generated. Touch characteristics and touch types for each touch event are determined from the map. By applying the touch characteristics and touch types to contextual information, a machine learned model, or a set of predefined rules, touches can be classified as wanted or unwanted touch events. Unwanted touch events may be ignored to improve user experience.

20 Claims, 25 Drawing Sheets

(56) References Cited

U.S. PATENT DOCUMENTS

| | | | |
|---|---|---|---|
| 2015/0002451 A1* | 1/2015 | Um | G06F 3/0446 345/174 |
| 2015/0160785 A1 | 6/2015 | Wang et al. | |
| 2016/0012348 A1 | 1/2016 | Johnson et al. | |
| 2016/0085372 A1 | 3/2016 | Munemoto et al. | |

* cited by examiner

Identify one or more touch events, each touch event having a location and a shape
2405

Group the one or more touch events into groups, the grouping based on the locations and shapes of each of the one or more touch events
2410

Classify at least one group as a group of unwanted touch events based at least in part on the grouping
2415

Determine, a priori, a set of touch event templates for a group of expected touch events, each touch event template representing a region of the surface and being defined by a corresponding set of at least two beams that would be disturbed by an expected touch event at the region
2505

Receive information indicating which beams have been disturbed by actual touch events
2510

Determine a subset of active templates from the set of touch event templates, each active template being a touch event template wherein the corresponding set of beams is disturbed by the actual touch events
2515

Form an activity map based on the subset of active templates, the activity map representing the actual touch events on or near the surface
2520

FIG. 25

UNWANTED TOUCH MANAGEMENT IN TOUCH-SENSITIVE DEVICES

CROSS REFERENCE TO RELATED APPLICATIONS

This application claims priority to U.S. provisional application 62/632,140 "Unwanted Touch Management in Optical Touch Sensors" filed on Feb. 19, 2018, the subject matter of which is incorporated herein by reference in its entirety.

BACKGROUND

1. Field of Art

This invention generally relates to detecting touch events in a touch-sensitive device, especially methods for classifying wanted and unwanted touches.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Furthermore, there are limits on the time available for resolving these ambiguities. If the approach adopted is too slow, then the technology will not be able to deliver the touch sampling rate required by the system. If the approach adopted is too computationally intensive, then this will drive up the cost and power consumption of the technology.

While interacting with a touch sensitive surface of a device, users can unintentionally cause touch events. For example, while writing on a touch surface, a user's palm may rest on or otherwise interact with surface. This can lead to an inefficient interface between the user and the device as well as user frustration. Thus, there is a need for improved touch-sensitive systems.

SUMMARY

Embodiments relate to classifying touch events on or near a touch surface as wanted or unwanted touch events. An example touch-sensitive device is an optical touch-sensitive device that is able to determine the locations of multiple simultaneous touch events. The optical touch-sensitive device includes multiple emitters and detectors. Each emitter produces optical beams which are received by the detectors. The optical beams preferably are multiplexed in a manner so that many optical beams can be received by a detector simultaneously. Touch events disturb the optical beams. Touch event templates are used to determine the actual touch events based on which optical beams have been disturbed.

Some embodiments relate to a method for classifying touch events on or near a surface. One or more touch events are identified, each touch event having a shape and a size. Based on the shapes and sizes, a touch type is assigned to each of the one or more touch events. At least one touch event is classified as an unwanted touch event based at least in part on the assigned touch type of the at least one touch event. In some embodiments, the method includes receiving context information including a list of touch types that can be classified as wanted. In these embodiments, classifying at least one touch event as an unwanted touch event is further based at least in part on the context information.

Some embodiments relate to another method for classifying simultaneous touch events on or near a surface. One or more touch events are identified, each touch event having a location and a shape. The one or more touch events are grouped into groups, the grouping based on the locations and shapes of each of the one or more touch events. At least one group is classified as a group of unwanted touch events based at least in part on the grouping. In some embodiments, subsequent to identifying one or more touch events, one or more of the touch events are classified as a fingertip touch event, a stylus touch event, a dorsal touch event, or a palm touch event based on the shapes of the touch events.

Some embodiments relate to a method for forming a map of touch events on or near a surface. The surface has emitters and detectors arranged along at least a portion of its periphery. The emitters produce optical beams received by the detectors. The touch events disturbing the optical beams. A set of touch event templates are a priori determined for a group of expected touch events, each touch event template representing a region of the surface and being defined by a corresponding set of at least two beams that would be disturbed by an expected touch event at the region. Information indicating which beams have been disturbed by actual touch events is received. A subset of active templates is determined from the set of touch event templates, each active template being a touch event template, wherein the corresponding set of beams is disturbed by the actual touch events. An activity map is formed based on the subset of active templates, the activity map representing the actual touch events on or near the surface.

BRIEF DESCRIPTION OF DRAWINGS

Embodiments of the present invention will now be described, by way of example, with reference to the accompanying drawings, in which:

FIG. 25 is a flow chart illustrating a method for forming a map of touch events one or near a surface, according to an embodiment.

DETAILED DESCRIPTION

I. Introduction

A. Device Overview

Figure 1:
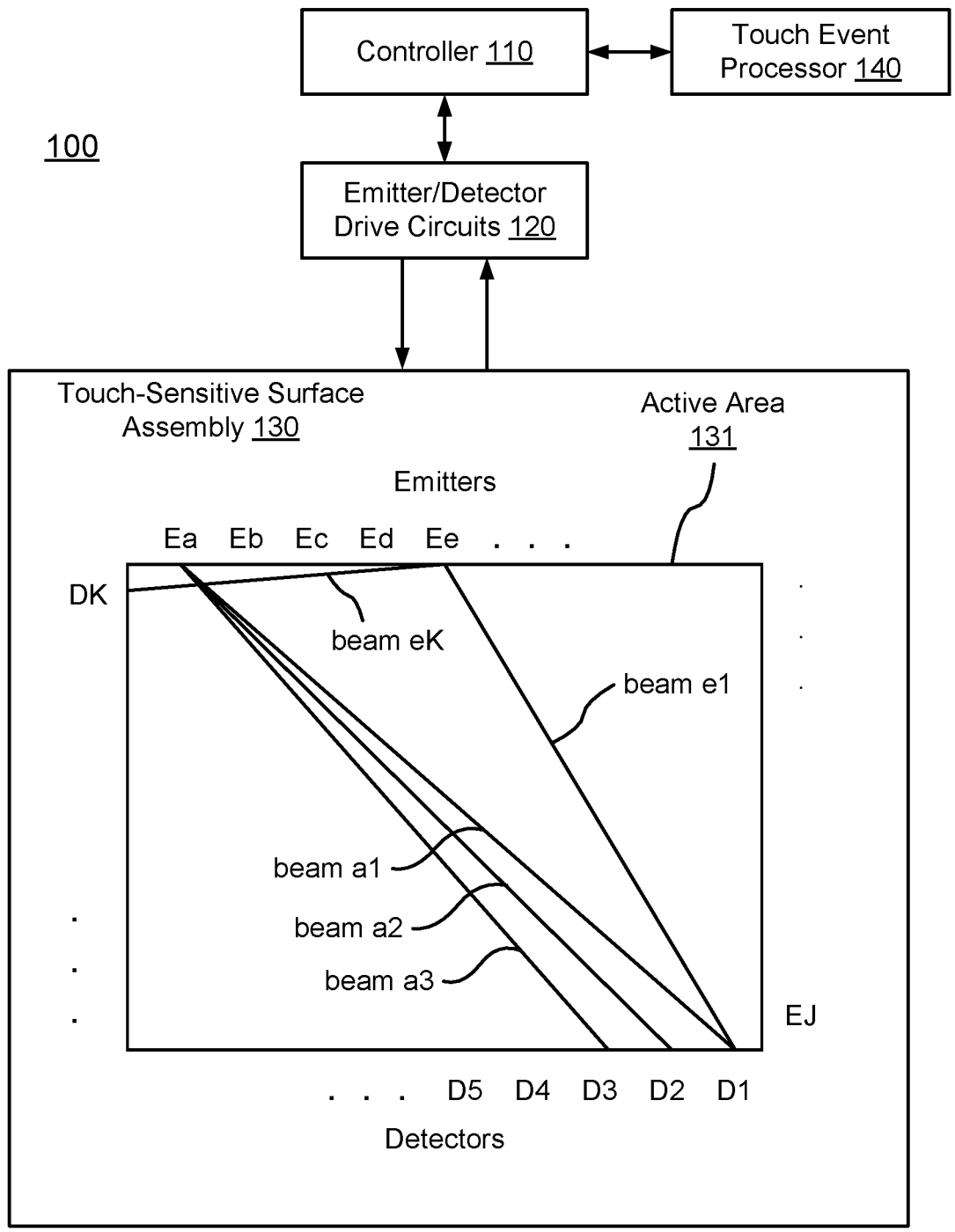
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along at least a portion of the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and whatever is on the other side of the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1, and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

B. Process Overview

Figure 2:
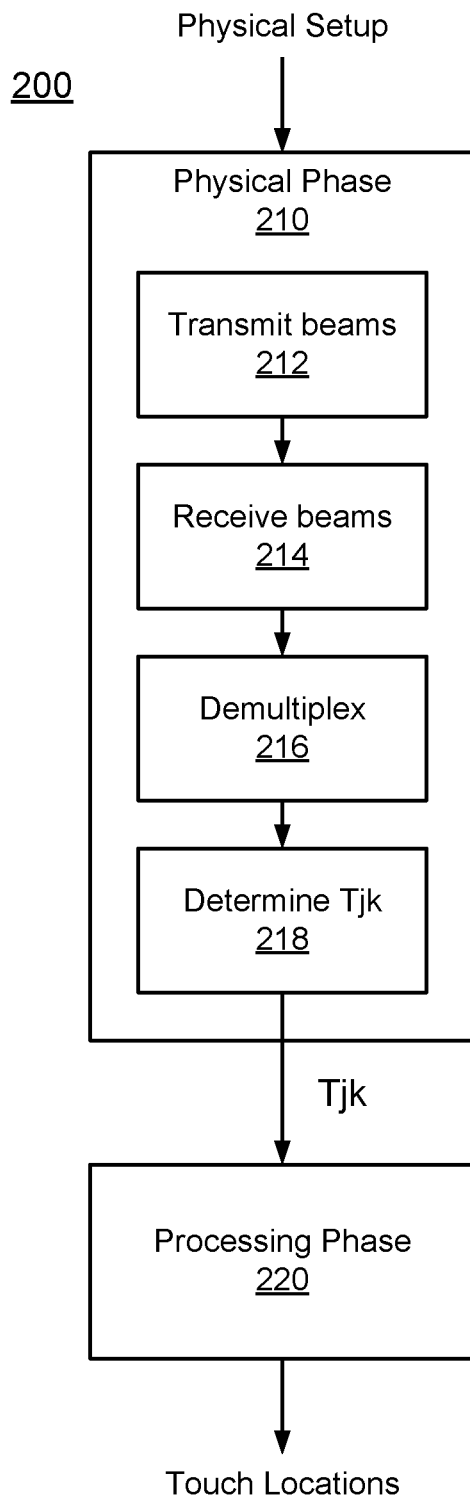
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk (also referred to as transmission values Tjk).

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates, and multi-pass approaches are all examples of techniques that may be used as part of the processing phase 220. Several of these are described below, primarily in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as a SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Figure 3A:
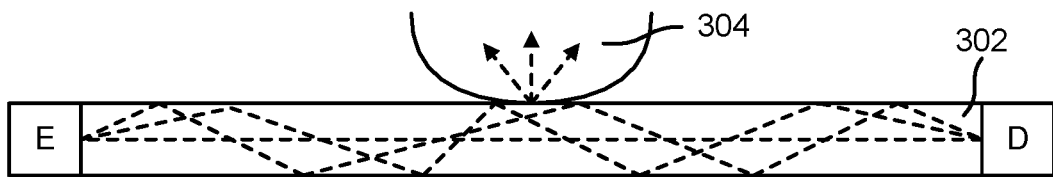
FIGS. 3A-3F illustrate different mechanisms for a touch interaction with an optical beam, according to some embodiments.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage. Emitters produce beams which are in close proximity to a surface 306. An object 304 coming into contact with the surface 306 will partially or entirely block beams within the contact area. FIGS. 3A and 3B illustrate two physical mechanisms for touch interactions, but other mechanisms can also be used. For example, the touch interaction may be based on changes in polarization, scattering, or changes in propagation direction or propagation angle (either vertically or horizontally).

Figure 3C:
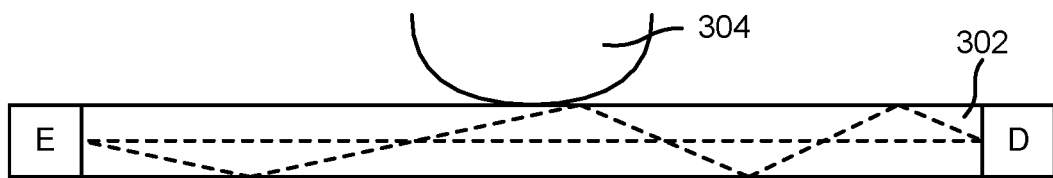

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating (by scattering), and may also absorb some of the incident light. In FIG. 3C, the optical beam travels at a steeper angle of propagation after the touch 304. Note that changing the angle of the light may also cause it to fall below the critical angle for total internal reflection, whereby it will leave the waveguide. The detector D has a response that varies as a function of the angle of propagation. The detector D could be more sensitive to the optical beam travelling at the original angle of propagation or it could be less sensitive.

Regardless, an optical beam that is disturbed by a touch 304 will produce a different response at detector D.

Figure 3D:
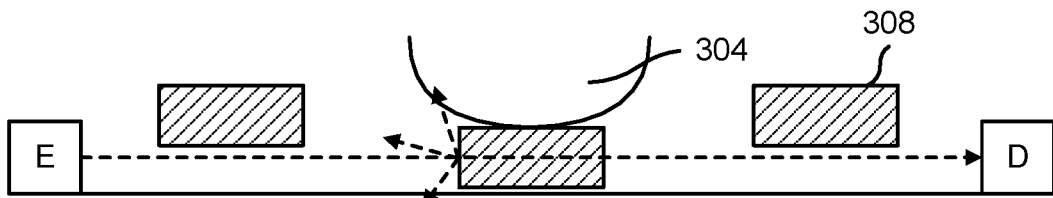

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
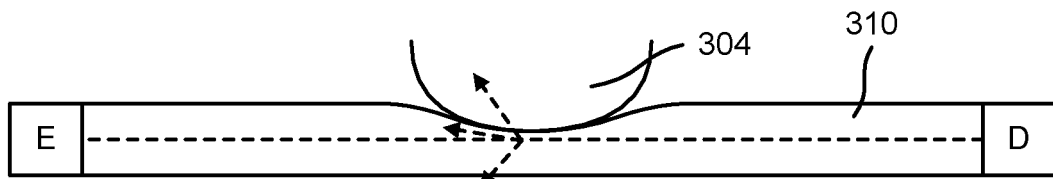

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be opaquer than the lower part, so that compression decreases the transmittance. Alternately, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
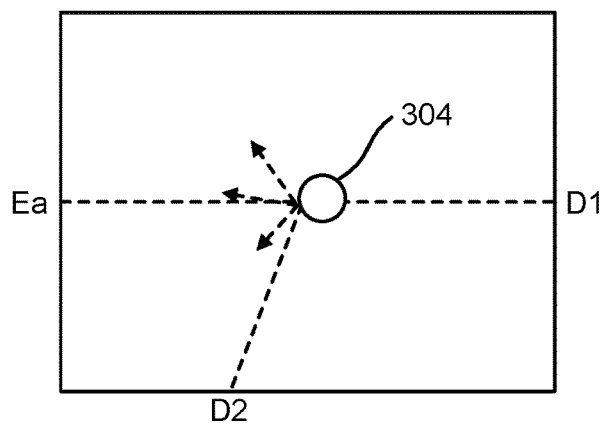

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
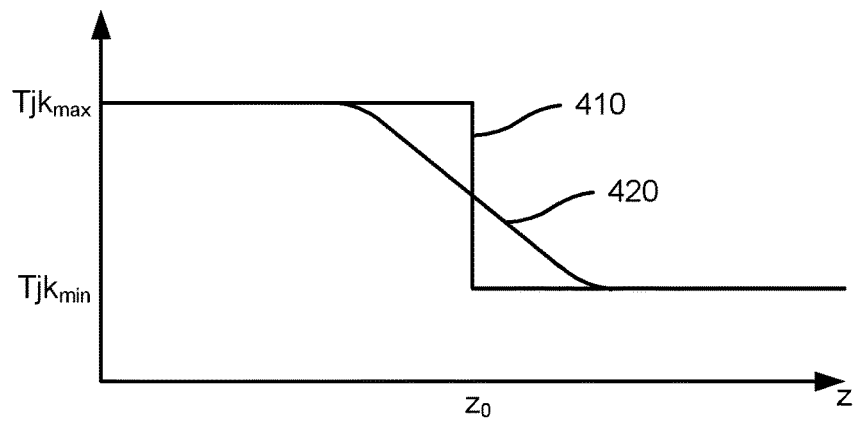
FIG. 4 are graphs of binary and analog touch interactions, according to some embodiments.

FIG. 4 is a graph illustrating a binary touch interaction mechanism compared to an analog touch interaction mechanism. FIG. 4 graphs the transmittance Tjk as a function of the depth z of the touch. The dimension z is into and out of the active surface. Curve 410 is a binary response. At low z (i.e., when the touch has not yet disturbed the beam), the transmittance Tjk is at its maximum. However, at some point $z_0$, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors, and Couplers

Each emitter transmits light to a number of detectors. Usually, each emitter outputs light to more than one detector simultaneously. Similarly, each detector receives light from a number of different emitters. The optical beams may be visible, infrared, and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics, and other optical components.

In this disclosure, the optical paths will be shown unfolded for clarity. Thus, sources, optical beams, and sensors will be shown as lying in one plane. In actual implementations, the sources and sensors typically will not lie in the same plane as the optical beams. Various coupling approaches can be used. A planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Application Ser. No. 61/510,989 "Optical Coupler" filed on Jul. 22, 2011, which is incorporated by reference in its entirety herein.

D. Optical Beam Paths

Figures 5A, 5B, 5C:
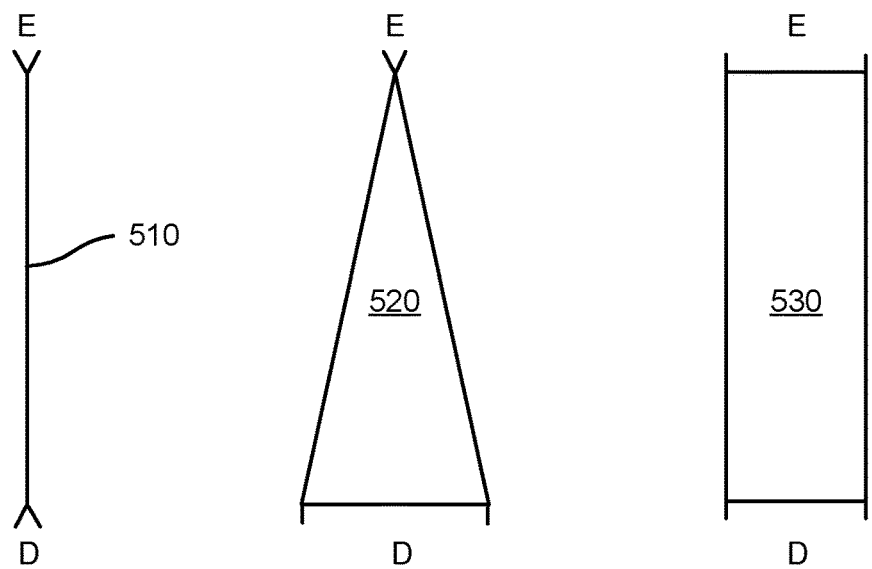
FIGS. 5A-5C are top views of differently shaped beam footprints, according to some embodiments.

Another aspect of a touch-sensitive system is the shape and location of the optical beams and beam paths. In FIGS. 1-2, the optical beams are shown as lines. These lines should be interpreted as representative of the beams, but the beams themselves are not necessarily narrow pencil beams. FIGS. 5A-5C illustrate different beam shapes.

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
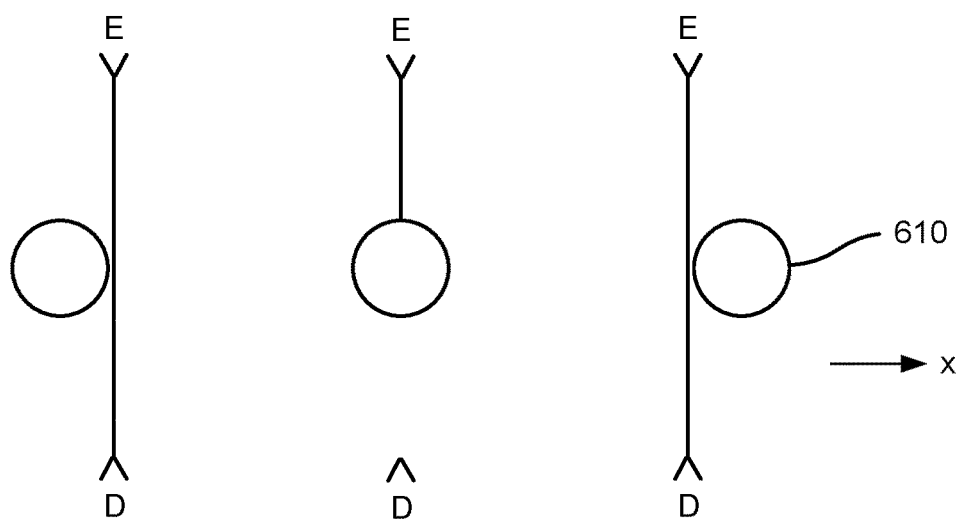
FIGS. 6A-6B are top views illustrating a touch point travelling through a narrow beam and a wide beam, respectively, according to some embodiments.
Figure 6B:
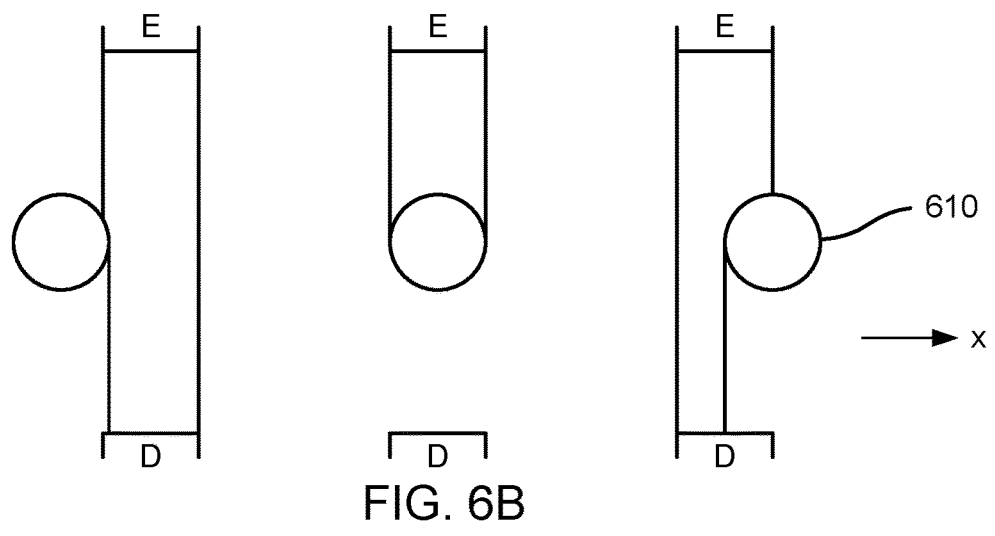
Figure 7:
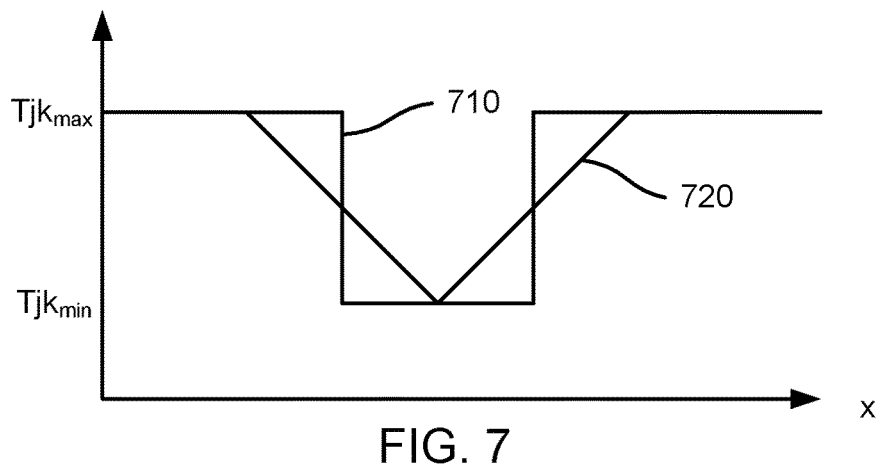
FIG. 7 are graphs of the binary and analog responses for the narrow and wide beams of FIGS. 6A-6B, according to some embodiments.

FIGS. 6A-6B and 7 show how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

FIGS. 5-7 consider an individual beam path. In most implementations, each emitter and each detector will support multiple beam paths.

Figure 8A:
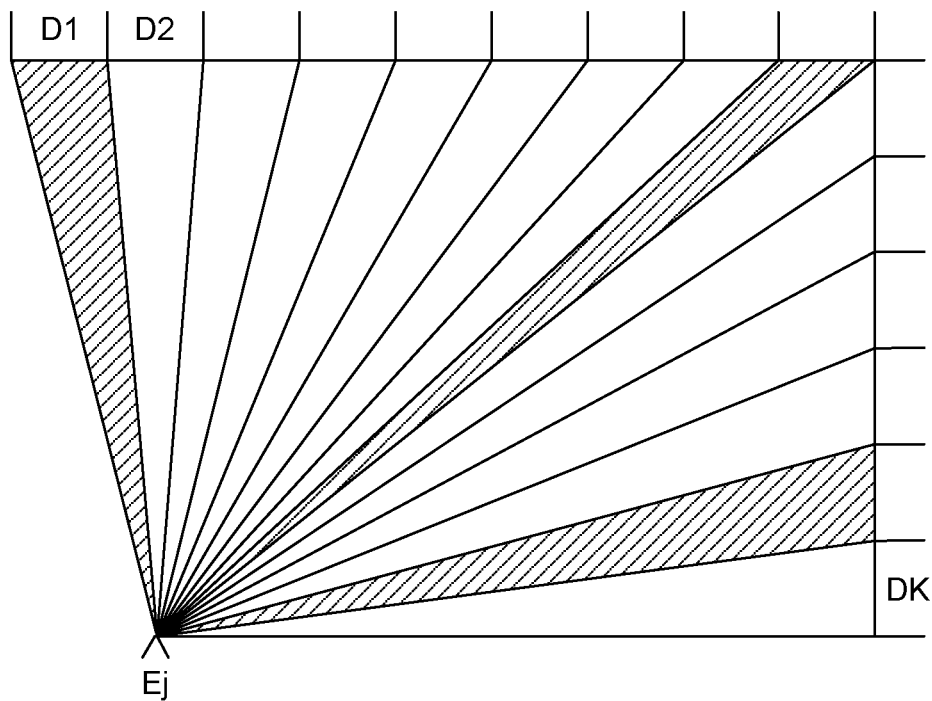
FIGS. 8A-8B are top views illustrating active area coverage by emitters, according to some embodiments.
Figure 8B:
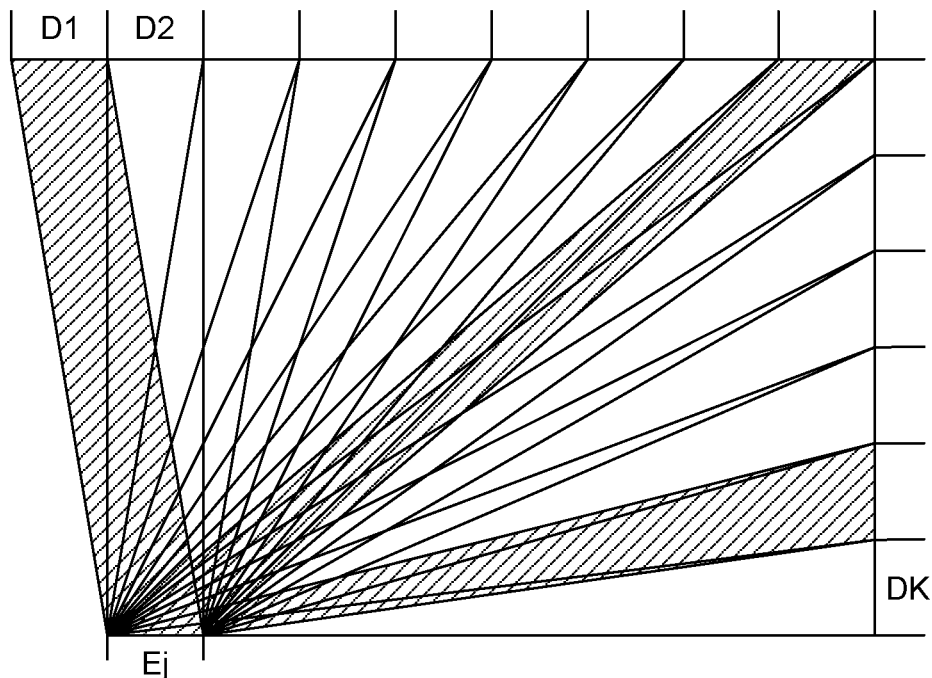

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but we will refer to them as rectangular). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors) and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore, an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
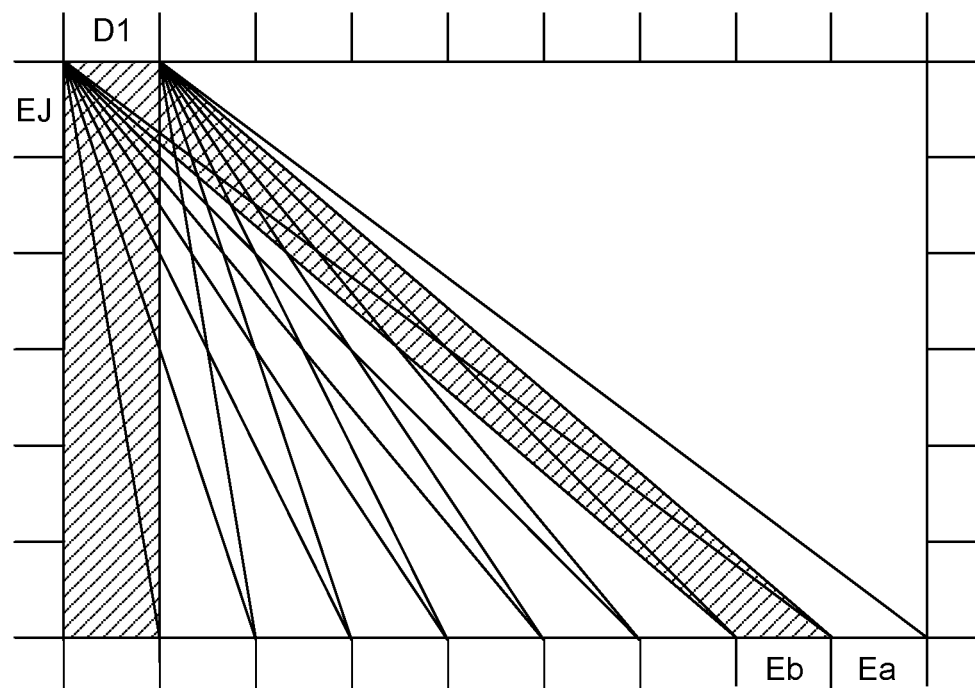
FIGS. 8C-8D are top views illustrating active area coverage by detectors, according to some embodiments.
Figure 8D:
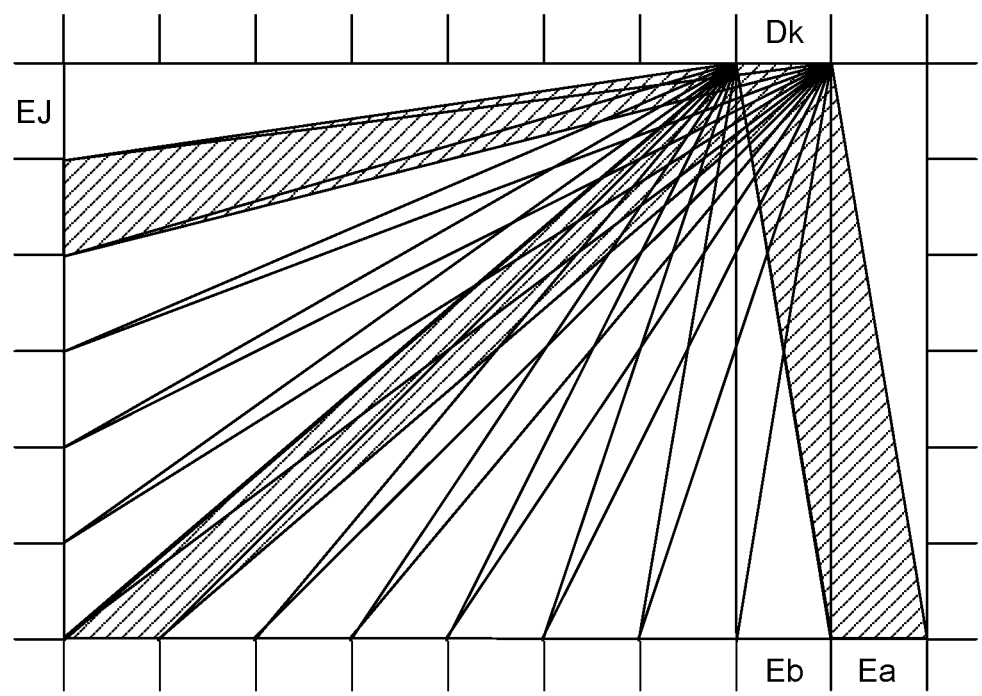

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

E. Active Area Coverage

The coverage of the active area 131 depends on the shapes of the beam paths, but also depends on the arrangement of emitters and detectors. In most applications, the active area is rectangular in shape, and the emitters and detectors are located along at least a portion of the periphery of the rectangle.

Figure 8E:
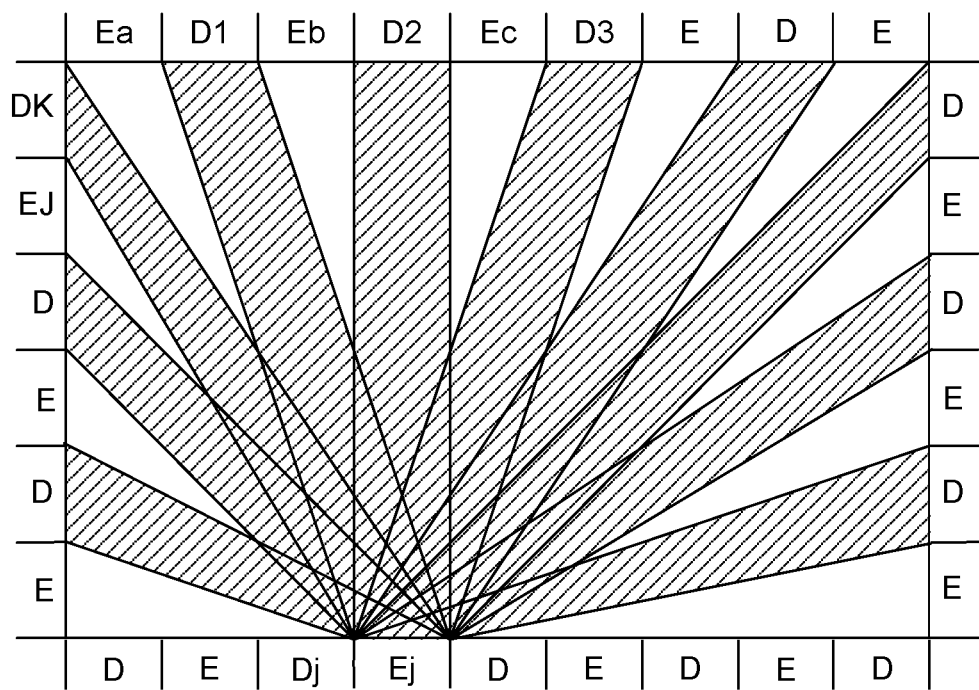
FIG. 8E is a top view illustrating alternating emitters and detectors, according to an embodiment.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742 "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller must cycle through the emitters quickly enough to meet the required touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. Pat. No. 8,350,831, "Method and Apparatus for Detecting a Multitouch Event in an Optical Touch-Sensitive Device," which is incorporated herein by reference.

B. Line Imaging

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location.

FIGS. 9-10 illustrate this concept using the emitter/detector layout shown in FIGS. 8B-8D. For convenience, the term "beam terminal" will be used to refer to emitters and detectors. Thus, the set of beams from a beam terminal (which could be either an emitter or a detector) form a line image of the touch points, where the viewpoint is the beam terminal's location.

Figure 9A:
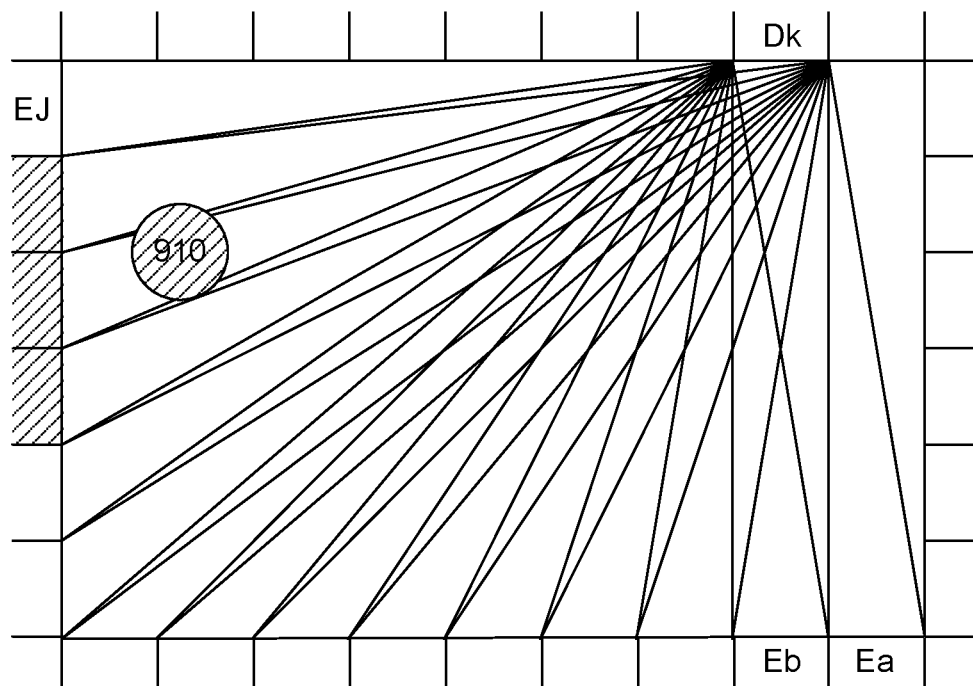
FIGS. 9A-9C are top views illustrating beam patterns interrupted by a touch point, from the viewpoint of different beam terminals, according to some embodiments.
Figure 9B:
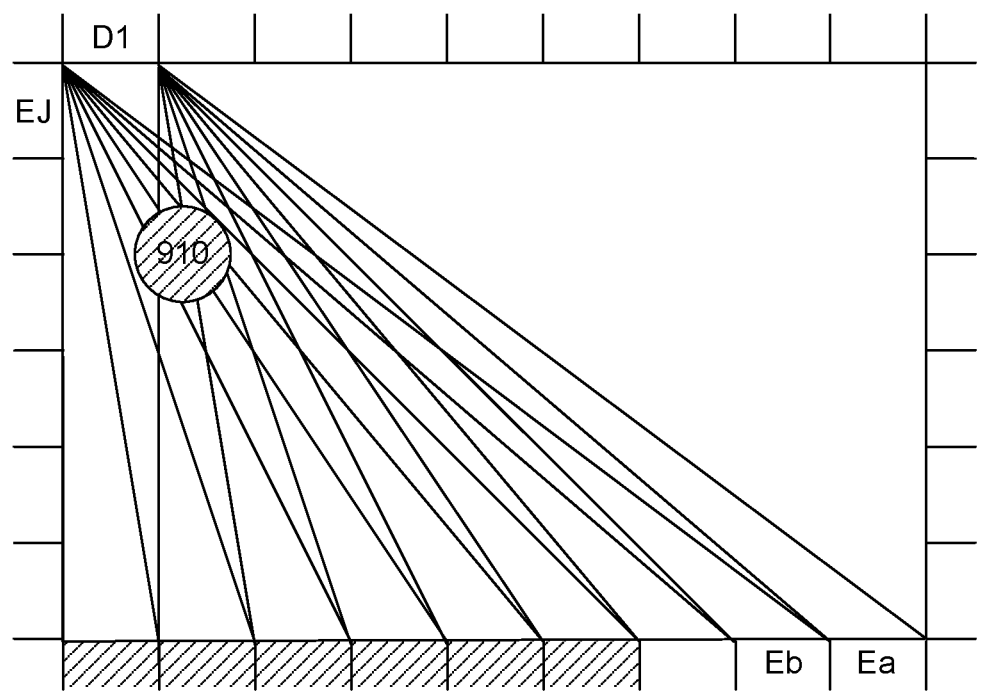
Figure 9C:
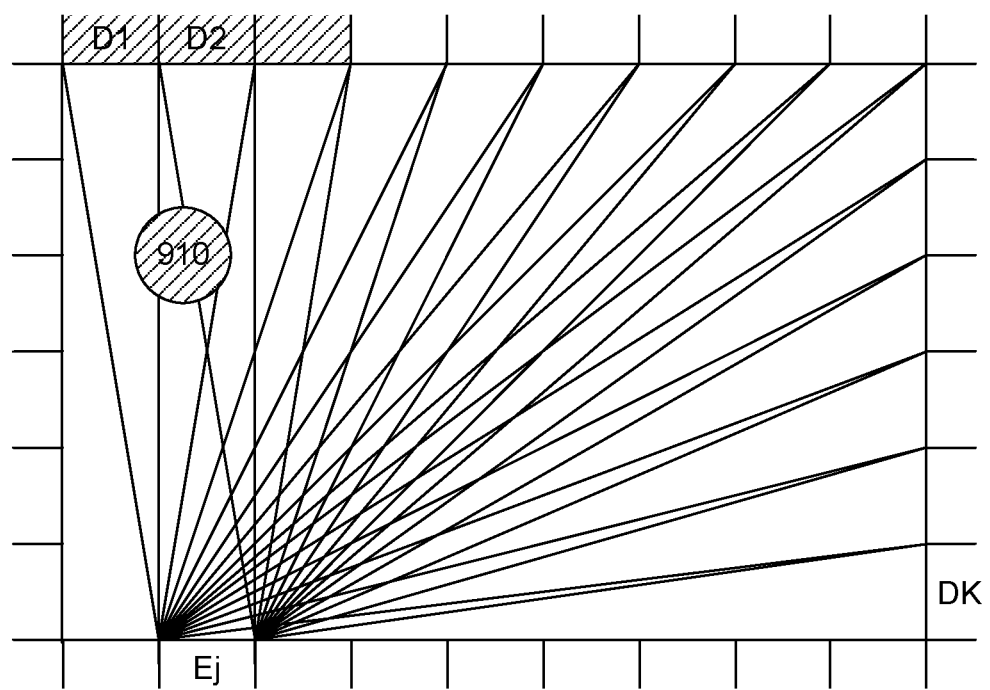
Figure 10A:
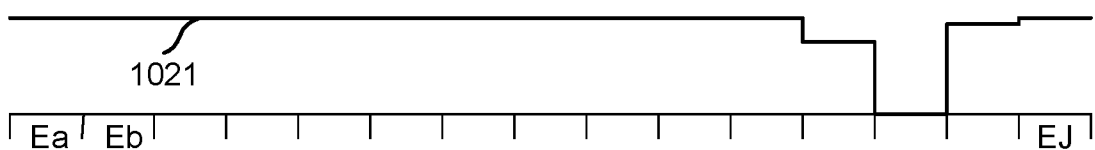
FIGS. 10A-10C are graphs of line images corresponding to the cases shown in FIGS. 9A-9C, according to some embodiments.

FIGS. 9A-C shows the physical set-up of active area, emitters and detectors. In this example, there is a touch point with contact area 910. FIG. 9A shows the beam pattern for beam terminal Dk, which are all the beams from emitters Ej to detector Dk. A shaded emitter indicates that beam is interrupted, at least partially, by the touch point 910. FIG. 10A shows the corresponding line image 1021 "seen" by beam terminal Dk. The beams to terminals Ea, Eb, . . . E(J−4) are uninterrupted so the transmission coefficient is at full value. The touch point appears as an interruption to the beams with beam terminals E(J−3), E(J−2) and E(J−1), with the main blockage for terminal E(J−2). That is, the portion of the line image spanning beam terminals E(J−3) to E(J−1) is a one-dimensional image of the touch event.

Figure 10B:
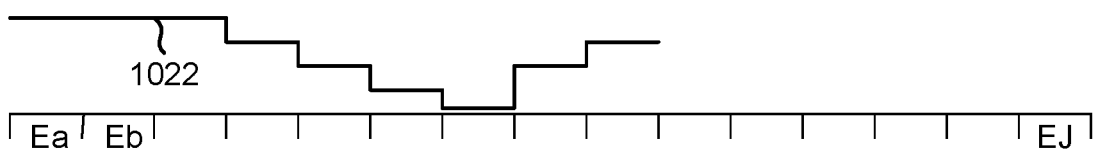
Figure 10C:
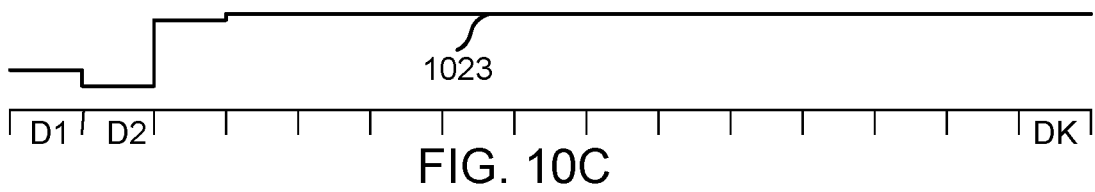

FIG. 9B shows the beam pattern for beam terminal D1 and FIG. 10B shows the corresponding line image 1022 seen by beam terminal D1. Note that the line image does not span all emitters because the emitters on the left edge of the active area do not form beam paths with detector D1. FIGS. 9C and 10C show the beam patterns and corresponding line image 1023 seen by beam terminal Ej.

The example in FIGS. 9-10 use wide beam paths. However, the line image technique may also be used with narrow or fan-shaped beam paths.

FIGS. 10A-C show different images of touch point 910. The location of the touch event can be determined by processing the line images. For example, approaches based on correlation or computerized tomography algorithms can be used to determine the location of the touch event 910. However, simpler approaches are preferred because they require less compute resources.

Figure 9D:
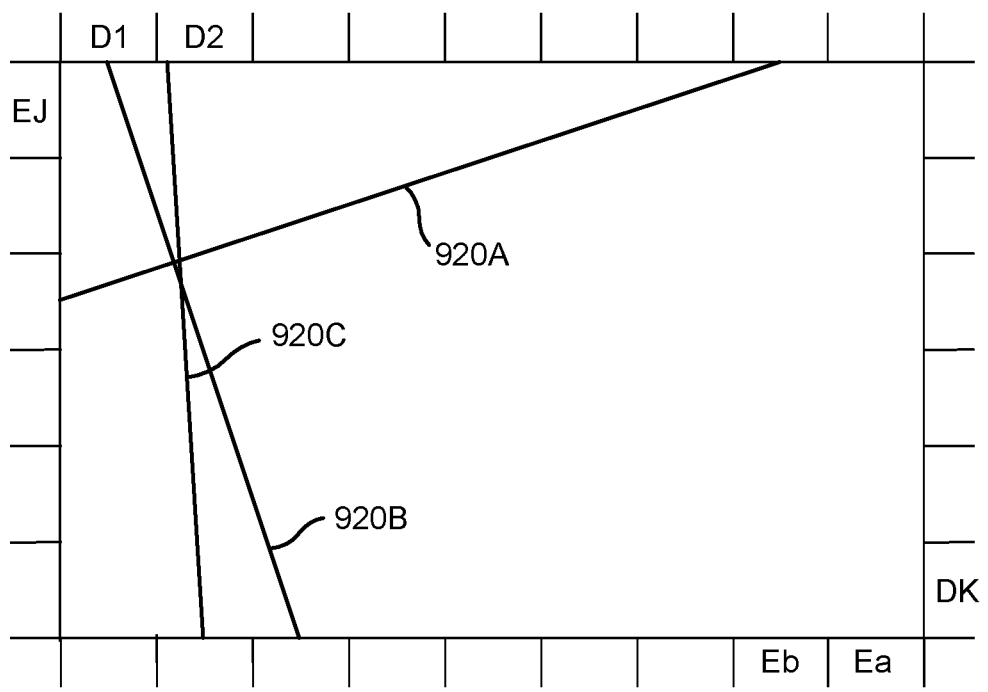
FIG. 9D is a top view illustrating estimation of the touch point, based on the interrupted beams of FIGS. 9A-9C and the line images of FIGS. 10A-10C, according to an embodiment.

The touch point 910 casts a "shadow" in each of the lines images 1021-1023. One approach is based on finding the edges of the shadow in the line image and using the pixel values within the shadow to estimate the center of the shadow. A line can then be drawn from a location representing the beam terminal to the center of the shadow. The touch point is assumed to lie along this line somewhere. That is, the line is a candidate line for positions of the touch point. FIG. 9D shows this. In FIG. 9D, line 920A is the candidate line corresponding to FIGS. 9A and 10A. That is, it is the line from the center of detector Dk to the center of the shadow in line image 1021. Similarly, line 920B is the candidate line corresponding to FIGS. 9B and 10B, and line 920C is the line corresponding to FIGS. 9C and 10C. The resulting candidate lines 920A-C have one end fixed at the location of the beam terminal, with the angle of the candidate line interpolated from the shadow in the line image. The center of the touch event can be estimated by combining the intersections of these candidate lines.

Each line image shown in FIG. 10 was produced using the beam pattern from a single beam terminal to all of the corresponding complimentary beam terminals (i.e., beam pattern from one detector to all corresponding emitters, or from one emitter to all corresponding detectors). As another variation, the line images could be produced by combining information from beam patterns of more than one beam terminal. FIG. 8E shows the beam pattern for emitter Ej. However, the corresponding line image will have gaps because the corresponding detectors do not provide continuous coverage. They are interleaved with emitters. However, the beam pattern for the adjacent detector Dj produces a line image that roughly fills in these gaps. Thus, the two partial line images from emitter Ej and detector Dj can be combined to produce a complete line image.

C. Location Interpolation

Applications typically will require a certain level of accuracy in locating touch points. One approach to increase accuracy is to increase the density of emitters, detectors and beam paths so that a small change in the location of the touch point will interrupt different beams.

Another approach is to interpolate between beams. In the line images of FIGS. 10A-C, the touch point interrupts several beams but the interruption has an analog response due to the beam width. Therefore, although the beam terminals may have a spacing of $\Delta$, the location of the touch point can be determined with greater accuracy by interpolating based on the analog values. This is also shown in curve 720 of FIG. 7. The measured Tjk can be used to interpolate the x position.

Figure 11A:
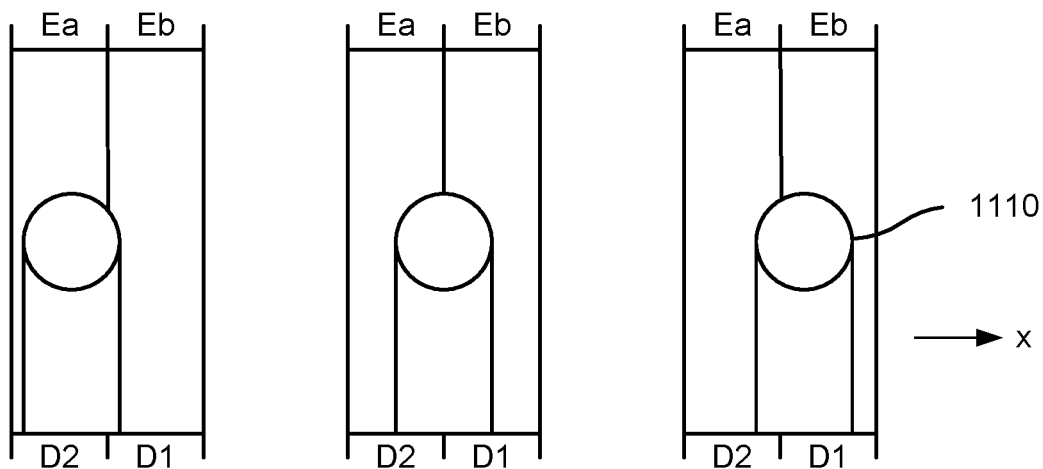
FIG. 11A is a top view illustrating a touch point travelling through two adjacent wide beams, according to an embodiment.
Figure 11B:
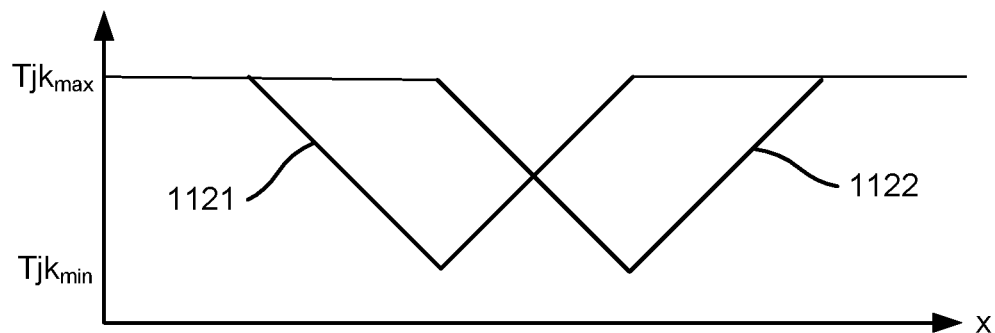
FIG. 11B are graphs of the analog responses for the two wide beams of FIG. 11A, according to some embodiments.

FIGS. 11A-B show one approach based on interpolation between adjacent beam paths. FIG. 11A shows two beam paths a2 and b1. Both of these beam paths are wide and they are adjacent to each other. In all three cases shown in FIG. 11A, the touch point 1110 interrupts both beams. However, in the lefthand scenario, the touch point is mostly interrupting beam a2. In the middle case, both beams are interrupted equally. In the righthand case, the touch point is mostly interrupting beam b1.

FIG. 11B graphs these two transmission coefficients as a function of x. Curve 1121 is for coefficient Ta2 and curve 1122 is for coefficient Tb1. By considering the two transmission coefficients Ta2 and Tb1, the x location of the touch point can be interpolated. For example, the interpolation can be based on the difference or ratio of the two coefficients.

The interpolation accuracy can be enhanced by accounting for any uneven distribution of light across the beams a2 and b1. For example, if the beam cross section is Gaussian, this can be taken into account when making the interpolation. In another variation, if the wide emitters and detectors are themselves composed of several emitting or detecting units, these can be decomposed into the individual elements to determine more accurately the touch location. This may be done as a secondary pass, having first determined that there is touch activity in a given location with a first pass. A wide emitter can be approximated by driving several adjacent emitters simultaneously. A wide detector can be approximated by combining the outputs of several detectors to form a single signal.

Figure 11C:
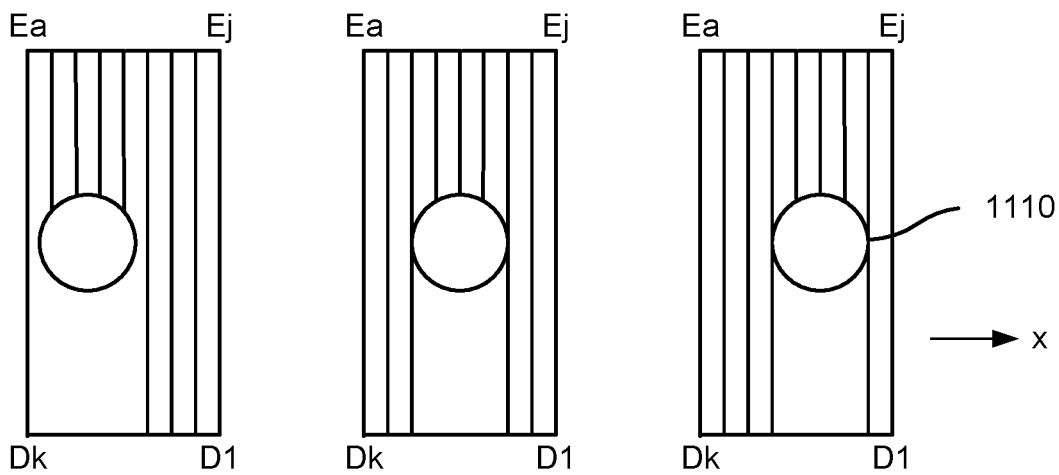
FIG. 11C is a top view illustrating a touch point travelling through many adjacent narrow beams, according to an embodiment.

FIG. 11C shows a situation where a large number of narrow beams is used rather than interpolating a fewer number of wide beams. In this example, each beam is a pencil beam represented by a line in FIG. 11C. As the touch point 1110 moves left to right, it interrupts different beams. Much of the resolution in determining the location of the touch point 1110 is achieved by the fine spacing of the beam terminals. The edge beams may be interpolated to provide an even finer location estimate.

D. Touch Event Templates

If the locations and shapes of the beam paths are known, which is typically the case for systems with fixed emitters, detectors, and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements. Thus, it is desirable to simplify the set of templates.

Figure 12A:
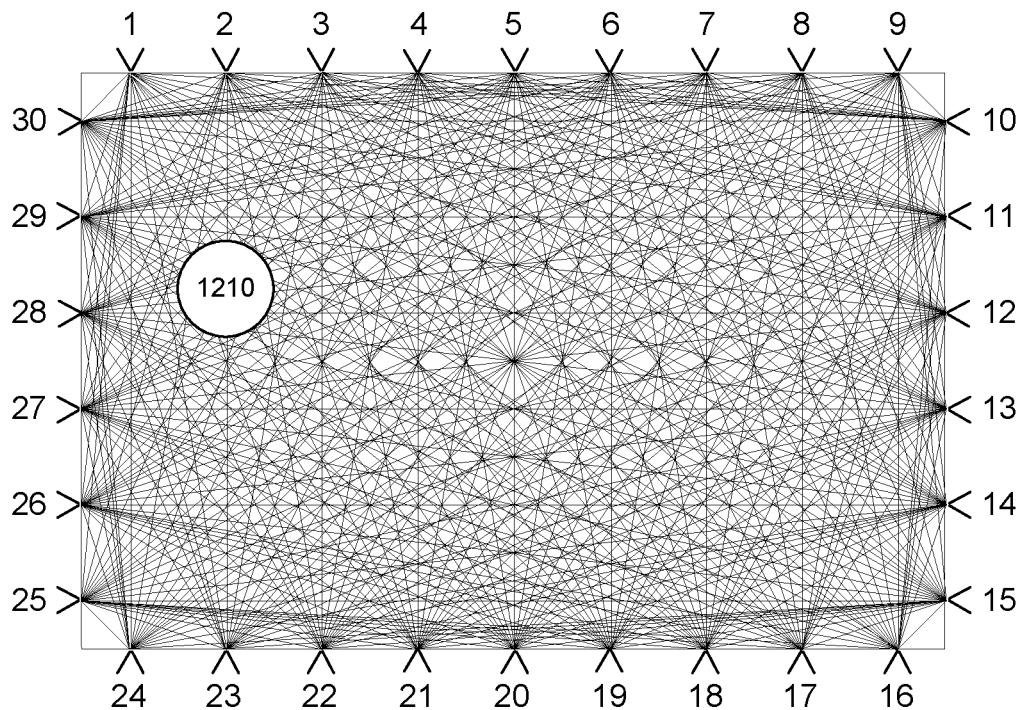
FIGS. 12A-12E are top views of beam paths illustrating templates for touch events, according to some embodiments.

FIG. 12A shows all of the possible pencil beam paths between any two of 30 beam terminals. In this example, beam terminals are not labeled as emitter or detector. Assume that there are sufficient emitters and detectors to realize any of the possible beam paths. One possible template for contact area 1210 is the set of all beam paths that would be affected by the touch. However, this is a large number of beam paths, so template matching will be more difficult. In addition, this template is very specific to contact area 1210. If the contact area changes slightly in size, shape or position, the template for contact area 1210 will no longer match exactly. Also, if additional touches are present elsewhere in the active area, the template will not match the detected data well. Thus, although using all possible beam paths can produce a fairly discriminating template, it can also be computationally intensive to implement.

Figure 12B:
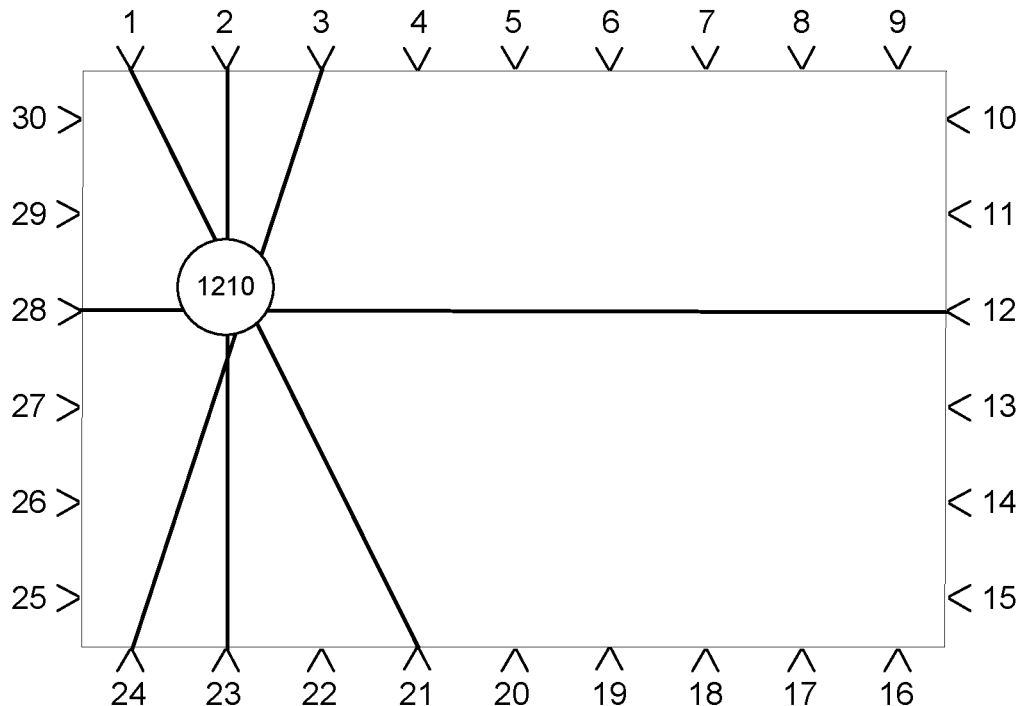

FIG. 12B shows a simpler template based on only four beams that would be interrupted by contact area 1210. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for contact area 1210, increasing in the number of beams contained in the template: a 2-beam template, a 4-beam template, etc. In one embodiment, the beams that are interrupted by contact area 1210 are ordered sequentially from 1 to N. An n-beam template can then be constructed by selecting the first n beams in the order. Generally speaking, beams that are spatially or angularly diverse tend to yield better templates. That is, a template with three beam paths running at 60 degrees to each other and not intersecting at a common point tends to produce a more robust template than one based on three largely parallel beams which are in close proximity to each other. In addition, more beams tends to increase the effective signal-to-noise ratio of the template matching, particularly if the beams are from different emitters and detectors.

Figure 12C:
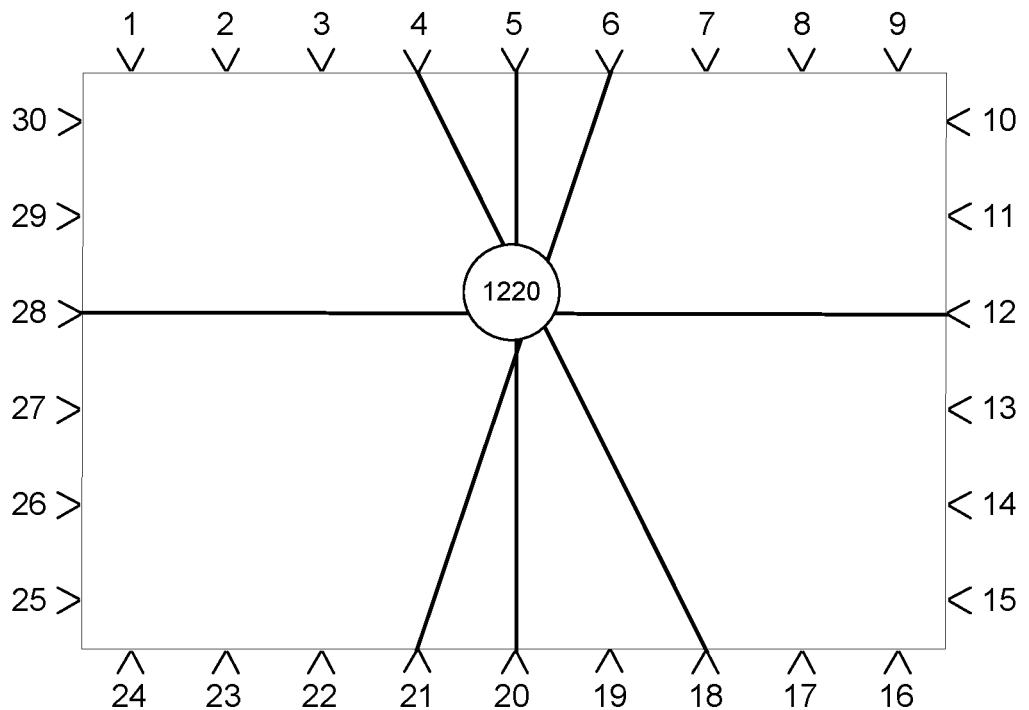

The template in FIG. 12B can also be used to generate a family of similar templates. In FIG. 12C, the contact area 1220 is the same as in FIG. 12B, but shifted to the right. The corresponding four-beam template can be generated by shifting beams (1,21) (2,23) and (3,24) in FIG. 12B to the right to beams (4,18) (5,20) and (6,21), as shown in FIG. 12C. These types of templates can be abstracted. The abstraction will be referred to as a template model. This particular model is defined by the beams (12,28) (i, 22–i) (i+1,24–i) (i+2,25–i) for i=1 to 6. In one approach, the model is used to generate the individual templates and the actual data is matched against each of the individual templates. In another approach, the data is matched against the template model. The matching process then includes determining whether there is a match against the template model and, if so, which value of i produces the match.

Figure 12D:
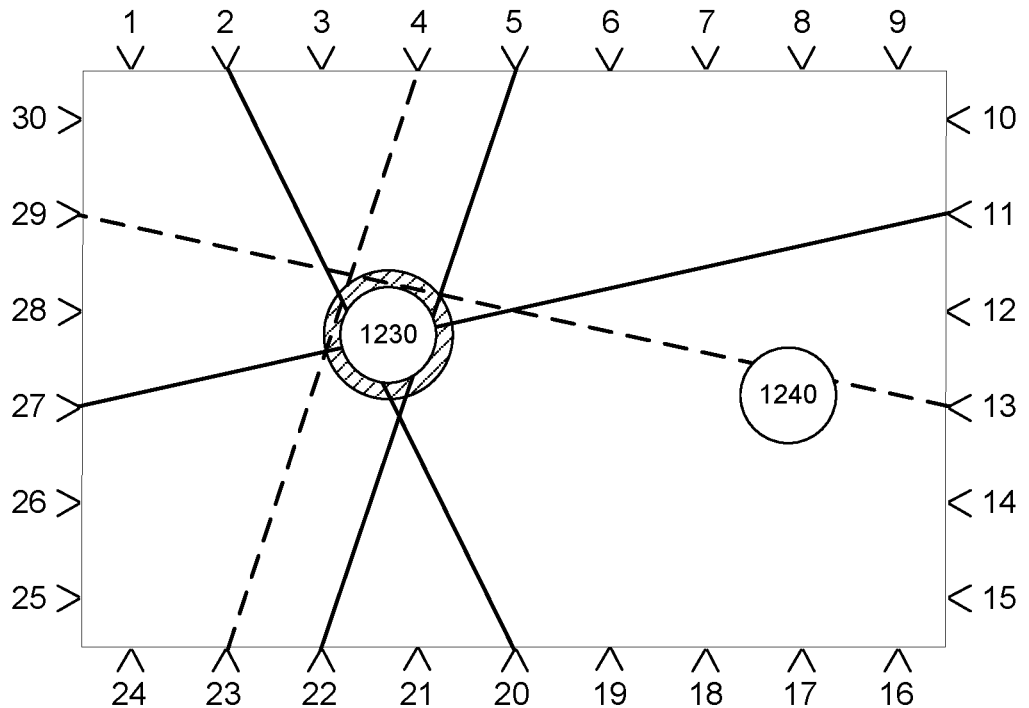

FIG. 12D shows a template that uses a "touch-free" zone around the contact area. The actual contact area is 1230. However, it is assumed that if contact is made in area 1230, then there will be no contact in the immediately surrounding shaded area. Thus, the template includes both (a) beams in the contact area 1230 that are interrupted, and (b) beams in the shaded area that are not interrupted. In FIG. 12D, the solid lines (2,20) (5,22) and (11,27) are interrupted beams in the template and the dashed lines (4,23) and (13,29) are uninterrupted beams in the template. Note that the uninterrupted beams in the template may be interrupted somewhere else by another touch point, so their use should take this into consideration. For example, dashed beam (13,29) could be interrupted by touch point 1240.

Figure 12E:
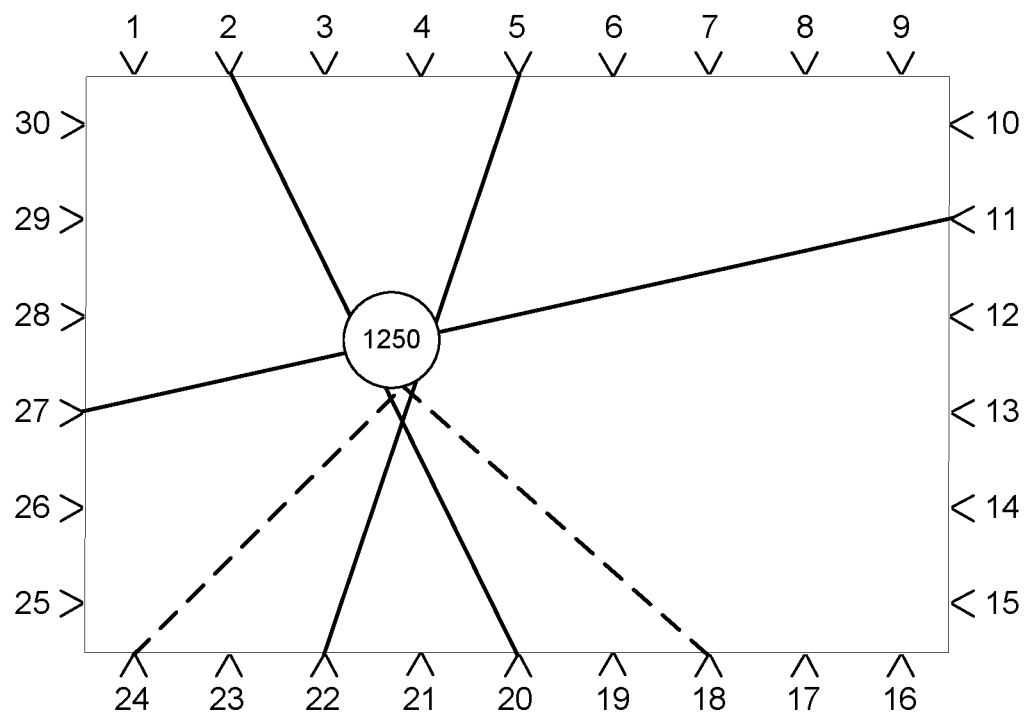

FIG. 12E shows an example template that is based both on reduced and enhanced transmission coefficients. The solid lines (2,20) (5,22) and (11,27) are interrupted beams in the template, meaning that their transmission coefficients should decrease. However, the dashed line (18,24) is a beam for which the transmission coefficient should increase due to reflection or scattering from the touch point 1250.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

In a case where there is a series of N beams, the analysis can begin with a relatively small number of beams. Additional beams can be added to the processing as needed until a certain confidence level (or SNR) is reached. The selection of which beams should be added next could proceed according to a predetermined schedule. Alternately, it could proceed depending on the processing results up to that time. For example, if beams with a certain orientation are giving low confidence results, more beams along that orientation may be added (at the expense of beams along other orientations) in order to increase the overall confidence.

The data records for templates can also include additional details about the template. This information may include, for example, location of the contact area, size and shape of the contact area and the type of touch event being modeled (e.g., fingertip, stylus, etc.).

In addition to intelligent design and selection of templates, symmetries can also be used to reduce the number of templates and/or computational load. Many applications use a rectangular active area with emitters and detectors placed symmetrically with respect to x and y axes. In that case, quadrant symmetry can be used to achieve a factor of four reduction. Templates created for one quadrant can be extended to the other three quadrants by taking advantage of the symmetry. Alternately, data for possible touch points in the other three quadrants can be transformed and then matched against templates from a single quadrant. If the active area is square, then there may be eight-fold symmetry.

Other types of redundancies, such as shift-invariance, can also reduce the number of templates and/or computational load. The template model of FIGS. 12B-C is one example.

In addition, the order of processing templates can also be used to reduce the computational load. There can be substantial similarities between the templates for touches which are nearby. They may have many beams in common, for example. This can be taken advantage of by advancing through the templates in an order that allows one to take advantage of the processing of the previous templates.

E. Multi-Pass Processing

Referring to FIG. 2, the processing phase need not be a single-pass process nor is it limited to a single technique. Multiple processing techniques may be combined or otherwise used together to determine the locations of touch events.

Figure 13:
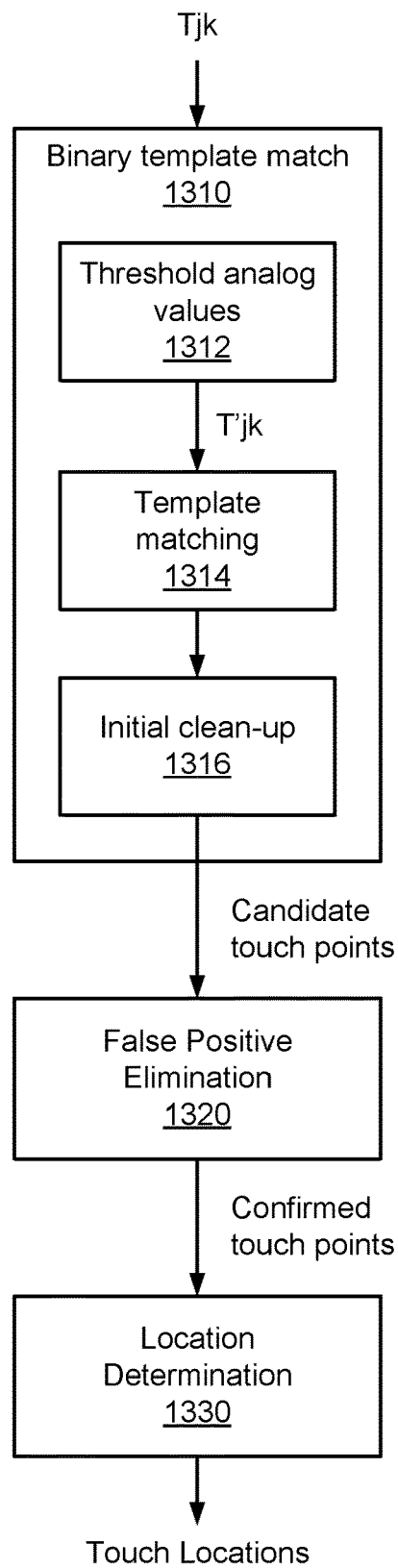
FIG. 13 is a flow diagram of a multi-pass method for determining touch locations, according to some embodiments.

FIG. 13 is a flow diagram of a multi-pass processing phase based on several stages. This example uses the physical set-up shown in FIG. 9, where wide beams are transmitted from emitters to detectors. The transmission coefficients $T_{jk}$ are analog values, ranging from 0 (fully blocked) to 1 (fully unblocked).

The first stage 1310 is a coarse pass that relies on a fast binary template matching, as described with respect to FIGS. 12B-D. In this stage, the templates are binary and the transmittances $T'_{jk}$ are also assumed to be binary. The binary transmittances $T'_{jk}$ can be generated from the analog values $T_{jk}$ by rounding or thresholding 1312 the analog values. The binary values $T'_{jk}$ are matched 1314 against binary templates to produce a preliminary list of candidate touch points. Thresholding transmittance values may be problematic if some types of touches do not generate any beams over the threshold value. An alternative is to threshold the combination (by summation for example) of individual transmittance values.

Some simple clean-up 1316 is performed to refine this list. For example, it may be simple to eliminate redundant candidate touch points or to combine candidate touch points that are close or similar to each other. For example, the binary transmittances $T'_{jk}$ might match the template for a 5 mm diameter touch at location (x,y), a 7 mm diameter touch at (x,y) and a 9 mm diameter touch at (x,y). These may be consolidated into a single candidate touch point at location (x,y).

Stage 1320 is used to eliminate false positives, using a more refined approach. For each candidate touch point, neighboring beams may be used to validate or eliminate the candidate as an actual touch point. The techniques described in U.S. Pat. No. 8,350,831 may be used for this purpose. This stage may also use the analog values $T_{jk}$, in addition to accounting for the actual width of the optical beams. The output of stage 1320 is a list of confirmed touch points.

The final stage 1330 refines the location of each touch point. For example, the interpolation techniques described previously can be used to determine the locations with better accuracy. Since the approximate location is already known, stage 1330 may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower norminal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

These weightings can be used in a number of different ways. In one approach, whether a candidate touch point is an actual touch event is determined based on combining the transmission coefficients for the beams (or a subset of the beams) that would be disturbed by the candidate touch point. The transmission coefficients can be combined in different ways: summing, averaging, taking median/percentile values or taking the root mean square, for example. The weightings can be included as part of this process: taking a weighted average rather than an unweighted average, for example. Combining multiple beams that overlap with a common contact area can result in a higher signal to noise ratio and/or a greater confidence decision. The combining can also be performed incrementally or iteratively, increasing the number of beams combined as necessary to achieve higher SNR, higher confidence decision and/or to otherwise reduce ambiguities in the determination of touch events.

IV. Wanted and Unwanted Touches

In addition to intentional touches (also referred to as wanted touches) disturbing beams, unwanted touches may also disturb beams. Unintentional or unwanted touches are touches that a user does not want to be recognized as a touch. Unwanted touches may also be inadvertent, inadequate, aberrant, or indeterminate. For example, while interacting with writing or drawing application, a user may rest the side of their hand on the surface while writing with a fingertip or stylus. Consequently, the touch system may detect the palm touch and treat it as a touch event. Furthermore, if the user is resting their hand on the surface, the dorsal side of their fingers (e.g., the small and ring fingers) may also interrupt beams and cause additional touch events. In these cases, the palm touch and the dorsal touches are unwanted touches because they are not intended by the user to cause a response from the writing system. Once touches are classified by the touch system as wanted or unwanted, the touches may be reported to other systems such as an operating system or a PC controlling a display. In some embodiments, unwanted touches are not reported.

The classification of a touch as a wanted or unwanted touch may change over time. A touch may change from being an unwanted touch to a wanted touch (or vice versa) during a touch event. For example, a person may initially present a finger at an orientation which is not consistent with an intentional action and then roll their finger so that it shows the attributes of an intentional touch.

Figure 14:
FIGS. 14-17 are top views illustrating combinations of different touch events, according to some embodiments.

FIGS. 14-17 show touch events that may be caused by a hand in a writing position near or on the surface (e.g., a right hand on the surface is holding a stylus), according to some embodiments. FIG. 14 shows the shapes of an intentional touch event 1400 and an unwanted touch event 1410. A fingertip touch will usually be substantially circular in shape. The intentional touch 1400 is circular in shape and may thus be caused by a tip of a finger on the touch surface (e.g., slightly inclined relative to the surface normal). The unwanted touch 1410 is located next to the intentional touch 1400 and has an oval shape. The long axis of the oval is tilted relative to the vertical axis of the page. The shape and orientation of the unwanted touch 1410 may be caused by the dorsal side of a finger curled under the palm on the touch surface.

Figure 15:
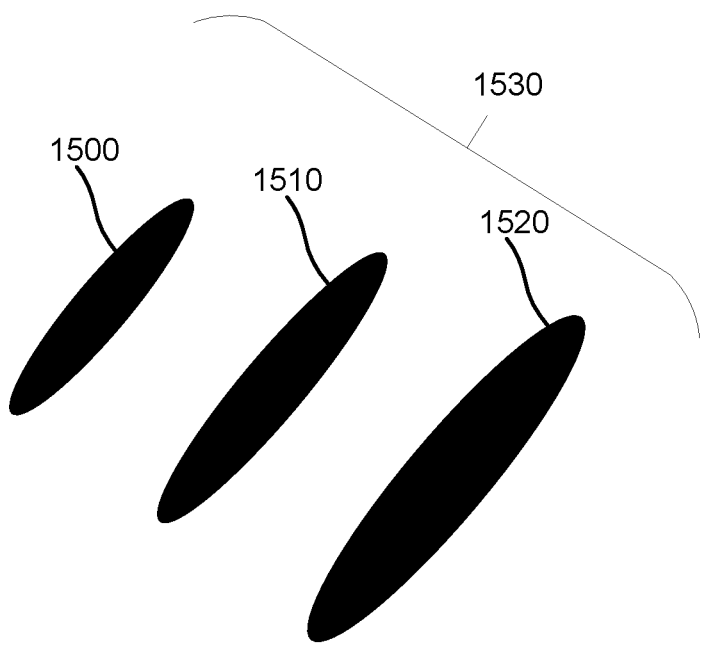

FIG. 15 shows a group of unwanted touch events 1530. Similar to the unwanted touch 1410 of FIG. 14, the individual touches 1500, 1510, and 1520 are next to each other, have oval shapes, and are tilted relative to the vertical axis of the page. Additionally, the long axes of the touches are substantially parallel to each other. For example, the long axes of the touches are orientated within 30 degrees of each other and the distance between touches is within 30 millimeters (mm) of each other. The touch events 1500, 1510, and 1520 increase in size from left to right (touch 1500 being the smallest and touch 1520 being the biggest). The size, order, and orientation of the combined pattern 1530 may be caused by an inclined set of fingers folded under the palm on the touch surface. For example, a stylus is held by the hand and the knuckles are on the surface.

Figure 16:
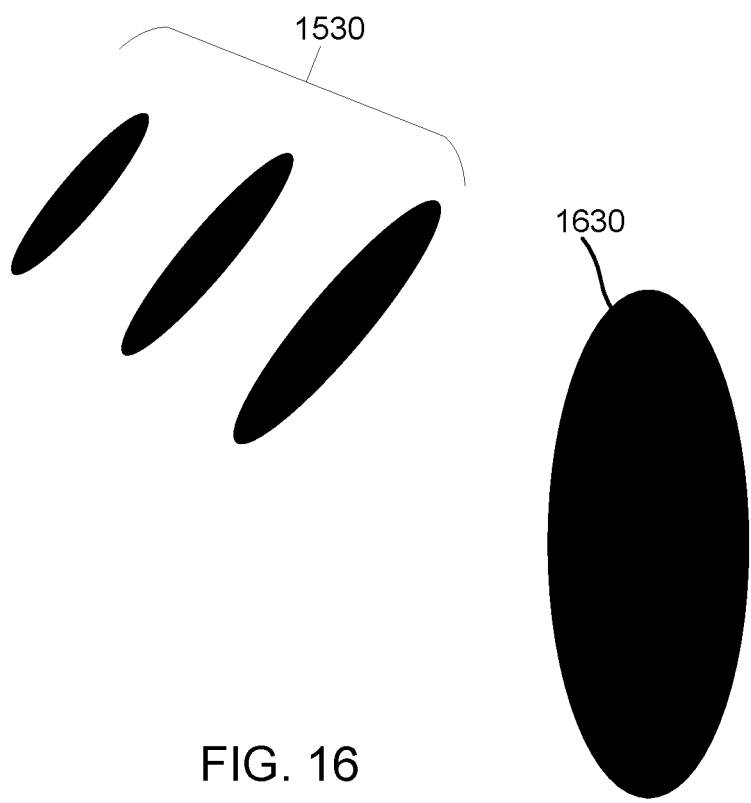

The front, back, or side of a hand will usually generate a touch which is large and elongated. Thus, FIG. 16 shows an unwanted palm touch event 1630 near the combined pattern 1530. The palm touch event 1630 is on the right side of the combined pattern 1530 and is oval in shape. The long axis is of the palm event 1630 is parallel to the vertical axis of the page.

Figure 17:
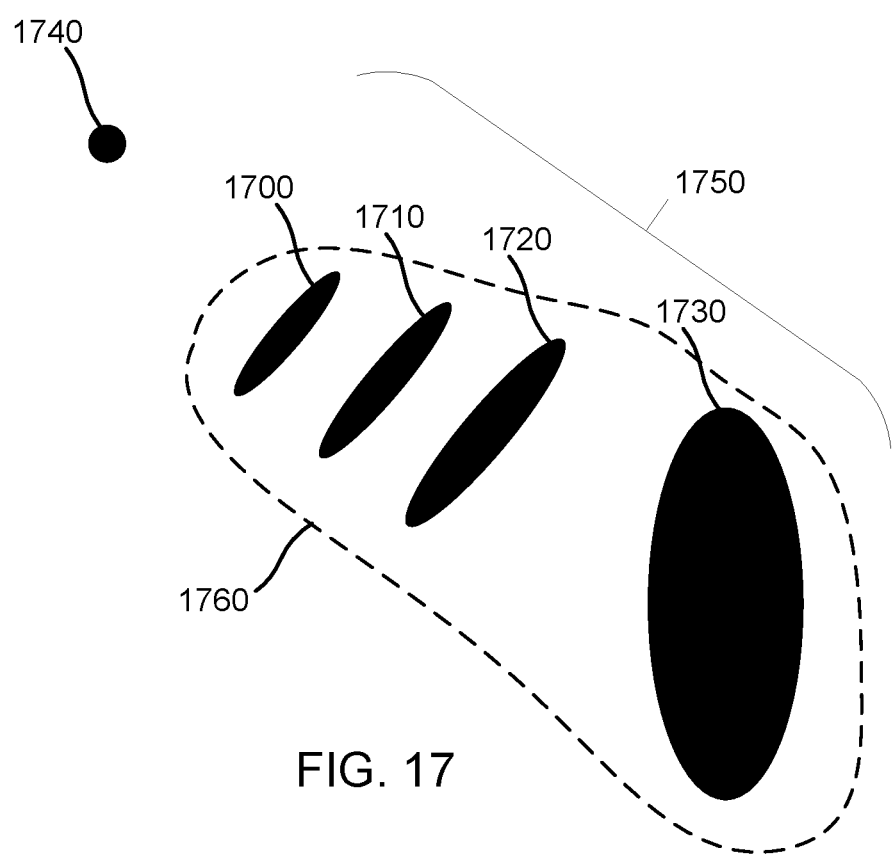

FIG. 17 shows a circular intentional touch 1740 that may be caused by a stylus or a fingertip and a group of unwanted touches 1750 similar to the unwanted touches of FIG. 16. In the example of FIG. 17, since the group of touches 1750 is recognized unwanted, a synthetic boundary 1760 is generated around the group 1750. Once the boundary 1760 is generated, touches within the boundary 1760 may be treated as unwanted, and touches outside the boundary 1760, such as 1740, may be treated as wanted. In some embodiments, the boundary 1760 is generated using image processing dilation methods where the touches are treated as pixels in an image.

V. Activity Maps

To classify touches as wanted or unwanted, a map of the touch events may be generated. The map may be referred to as an activity map and is a representation of touch activity detected by the touch system (e.g., FIGS. 14-19 may represent touch events of an activity maps). An activity map indicates touch characteristics, such as the size, shape, orientation, and location, of each detected touch event. In some embodiments, an activity map divides the surface into a set of regions, and (e.g., for a given time period) each region is labeled as activated or inactivated based on disturbances of beams corresponding to each region.

A. Templates

The activity map may be formed using a set of a priori templates. In these embodiments, each template represents a region on the touch surface (e.g., see FIG. 18A) and each template is defined by a set of at least two beams that would be disturbed by a touch event at the region. Thus, if a touch event occurs at one or more regions, an activity map can be formed by evaluating templates for each region of the touch surface.

A template value may be calculated by aggregating the transmission values $T_{jk}$ of beams associated with that region. A template may be determined to be active if a proportion of the aggregated beam values $T_{jk}$ have changed by more than a threshold amount (e.g., relative to beam transmission values $T_{jk}$ in the absence of a touch event). The proportion of aggregated beam values $T_{jk}$ may be specified to include all beam values associated with that region or specified to include a smaller subset of beam values $T_{jk}$ associated with that region. The proportion of aggregated beam values $T_{jk}$ may include any beams with beam values $T_{jk}$ that have changed by more than a threshold amount or the subset may include a specified subset of beams. For example, the proportion of beams includes beams emitted from each side of the periphery. In another example, the proportion of beams includes beams with high angular diversity (e.g., three beam paths run at 60-degree angles to each other). Alternatively, a template may be determined to be active if the mean or average of the beam transmission values $T_{jk}$ have changed by more than a threshold amount.

The threshold for determining whether a beam value is disturbed (e.g., blocked) by a touch event is preferably set at a level which is above the noise levels of the beam transmission value $T_{jk}$ (meaning a beam is considered disturbed if the beam transmittance received by the detector drops to a level that is unlikely to be caused by noise alone). However, if touch events do not strongly affect the beams, template processing may be performed by using thresholds which are within the noise level of the transmissions values $T_{jk}$. In some cases, beam transmissions $T_{jk}$ exceed the threshold solely due to noise, but false positives can be avoided by specifying that a template is only deemed to be active when a certain proportion of beams in the template are above the threshold because the probability of the specified proportion of beams exceeding the threshold due to random fluctuations is low.

Templates that are deemed to be active as a result of noise or other spurious activity can also be eliminated using rules of temporal or spatial continuity. With regard to temporal continuity, noise-induced activity is typically transient. As such, a template giving an active result due to noise in one computation associated with beam data at a time T1 is unlikely also to give an active result in successive computations for beam data at times T2, T3, etc. Thus, rules, heuristics, or other types of constraints may be placed on templates such that templates are only considered active if they are active for a threshold number of beam data sets within a determined time window. An additional or alternative constraint can mandate a template to be active for a contiguous set of beam data sets.

Spatial continuity rules may be applied to eliminate templates that are incorrectly deemed active due to noise or spurious activity. Since templates deemed active due to a touch event are typically near or adjacent to other active templates, spatial continuity may be applied by evaluating templates which are located close to one another. Generally, the templates within 2 mm of one anther are grouped together although, the threshold for determining if templates are close may depend on the smallest contact size to be detected and the size of the template regions. For example, templates within 4 mm of each other are grouped together if the touch system is intended to detect fingers and the size (e.g. circumference) of the template regions is 2 mm. For example, an individual active template may be declared inactive if no nearby templates are also active. In some embodiments, morphological image processing methods are applied. For example, template results are treated as pixels in an image and morphological dilation and erosion are performed to affect a morphological closing function which removes small or isolated areas of activity.

In various embodiments, the area of each region is based on a minimum size of a touch which is to be identified and classified. For example, if the intention is to differentiate styli and fingertip touches from larger touches, then the template size can be large. This can be helpful in reducing the processing workload associated with classification. Conversely, applying templates to small regions of the sensing surface may use more computational resources, but can result in detailed representations of the touching objects in the activity map. In particular, a region size which is equal to the width the optical beams may allow for the smallest touches to be detected. For example, a touch system with optical beams with a width W of 4 mm can use a region size (i.e., would include beams with centerlines which are within a radius) of W/4, which is 1 mm in this example. To apply such a template, the beam transmissions Tjk for all beams with centerlines passing within a 1 mm radius of the template center can be processed to give a single result for that template, such as active/inactive. A complete set of templates covering the sensing surface at a distance of 1 mm center-to-center would ensure that a small (~2 mm diameter) touch in any location would cause at least one template to respond.

Various settings for beam and template activity criteria may be used to generate multiple activity maps. For example, if multiple thresholds are established for determining active templates, an activity map can be formed based on touches which strongly affect beams (e.g., forceful touches) and another activity map can be formed based on touches which weakly effect beams (e.g., less forceful touches). This may be advantageous because intentional touches are generally more forceful than unwanted touches. For example, in optical waveguide touch systems, unwanted dorsal finger touches do not typically generate large changes to beam transmission coefficients Tjk compared to ventral finger touches due to lower applied force and lower sebum levels on the dorsal side skin surface. In another example, template sizes can be varied to generate multiple activity maps. For example, since unwanted (e.g., palm and forearm) touches tend to be larger than wanted (e.g., fingertip and stylus) touches, a first activity map with large template sizes may be generated to classify unwanted touches (smaller touches will not disturb enough beams to activate the larger templates). After the larger touches are identified, a second activity map with smaller template sizes may be generated to identify the smaller touches.

B. Template Clustering and Beam Analysis

Once templates are determined to be active or inactive, groups of active templates may represent touch events. Thus, active templates may be gathered into clusters to represent touch events. As a result, touches and touch characteristics can be recognized, determined, and reported. In some embodiments, morphological methods, such as shape matching are used to cluster active templates. Morphological analysis may also be applied to estimate touch characteristics such as size, orientation, degree of concavity, compactness, circularity, and shape factors (such as the aspect ratio) of the clusters.

Figure 18B:
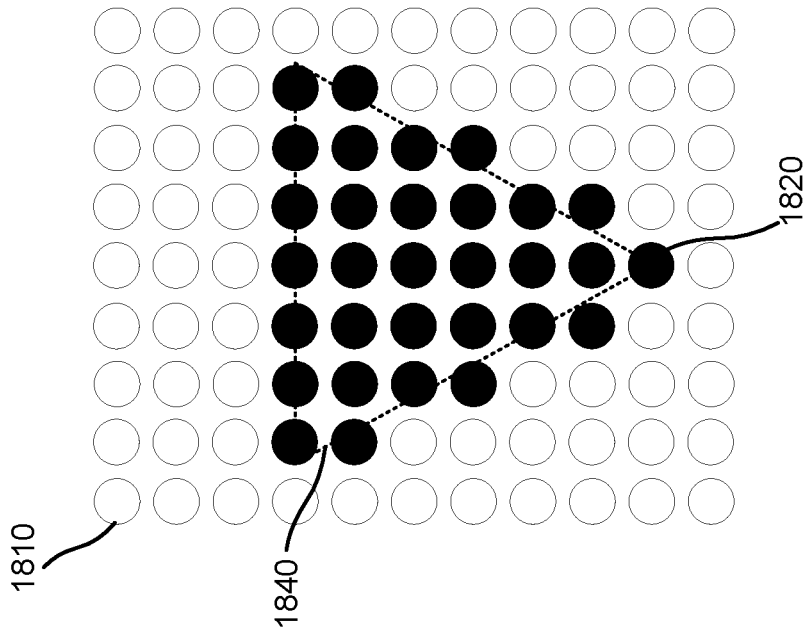
FIGS. 18A-18B are top views illustrating templates representing regions of the touch surface, according to some embodiments.
Figure 18A:
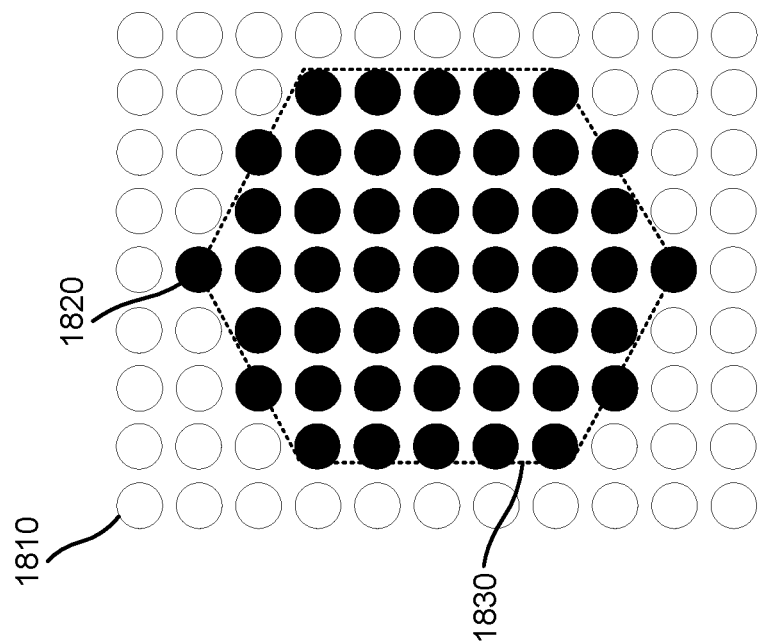
Figure 19:
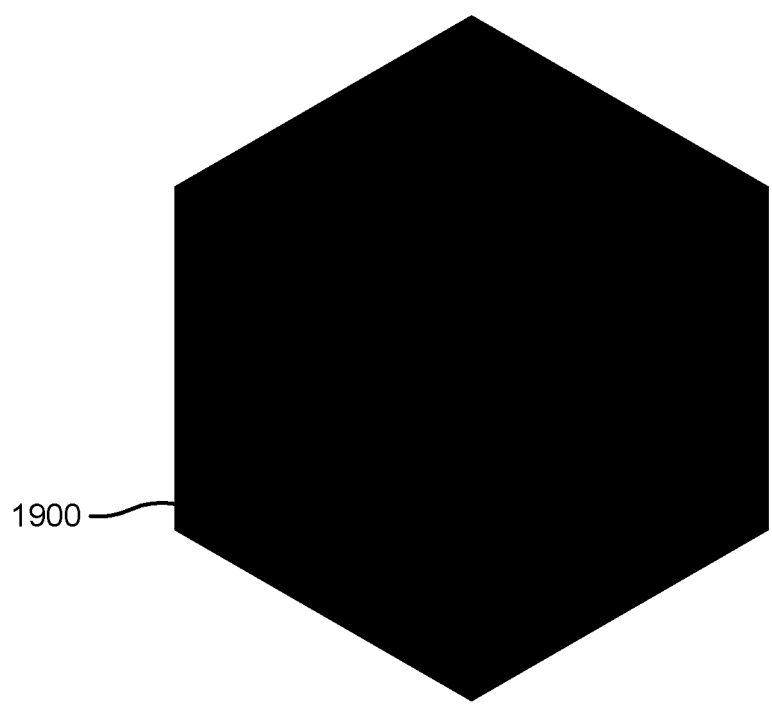
FIG. 19 is a top view illustrating a hexagonal touch event, according to an embodiment.

To illustrate template clustering, FIG. 18A shows a two-dimensional array of small templates representing regions of the touch surface. A hexagonal object 1830 has been presented to the touch sensing surface. In this example, template transmission values Tjk are compared with a threshold value below which the templates are deemed active, and at or above which templates are deemed to be inactive. Template 1810 is an example of a template outside of the touched area and is calculated to be inactive (e.g., because aggregation of the changes in beam transmission values Tjk near that region are below the threshold). Template 1820 is an example of a template inside of the touched area and is calculated to be active. After all of the active templates are determined, the templates may be clustered. As a result, it is determined that a touch event has a hexagonal shape. Referring to FIG. 19, a high-resolution representation of a hexagonal touch event 1900 is illustrated. The high-resolution event 1900 may be derived by using smaller templates than those illustrated in FIG. 18A.

In another example, FIG. 18B shows a two-dimensional array of small templates representing regions of the touch surface, where a triangular object 1840 (oriented with a vertex pointing downward) has been presented to the touch sensing surface. Template 1810 is outside of the touched area and is calculated to be inactive. Template 1820 is inside of the touched area and calculated to be active. Thus, by clustering the active templates, the touch system determines the touch event has a triangular shape.

C. Identifying Touch Types and Touch Groups

After an activity map is formed, touch types of touches on the activity map may be identified. A touch type of a touch event describes the object causing the touch event, a shape of the touch event, or a size of the touch event. Examples of touch types include finger-tip, finger-dorsal, finger-ventral, eraser-small, eraser-large, hand-side, stylus-type1, stylus-type2, object-triangle, object-square, object-equilateral triangle, arrow-pointing left, arrow-pointing right, arrow-at 45 degrees, forearm, sleeve, etc. As described below, touch types may be classified by a machine learned model. Touch types may also be classified based on the touch characteristics (e.g., identified in the activity map) of the touch events because touch objects typically have consistent touch characteristics. For example, fingertip touches are typically circular, dorsal touches are typically oval, and sleeve touches are typically triangular. In another example, although dorsal, palm, and forearm touches may have similar shapes, forearm touches are typically larger than palm touches and palm touches are typically larger than dorsal touches (e.g., type are assigned based on predetermined size ranges for each type).

Touch types may also be determined by analyzing beam transmission Tjk values. Touches by one or more touches types may disturb beams such that the touches are identifiable. For example, ventral finger touches on an optical waveguide sensor typically creates lower transmission values Tjk than dorsal touches due to higher sebum levels on the ventral skin surface. In some cases, styli and other instruments, such as erasers, disturb beams in a recognizable pattern. For example, a stylus is designed so that it disturbs beams from one direction differently than beams from an orthogonal direction. Thus, touches from styli may be classified as stylus touches by analyzing the transmission values Tjk of the disturbed beams.

In some embodiments, after an activity map is formed, touch events are categorized into groups. Touches may subsequently be classified as wanted or unwanted according to their assigned groups. Touches may be grouped according to touch types. For example, all palm touches are grouped together. Touches may be grouped according to their proximity to other touches. For example, all touches within a threshold distance from a first touch event are grouped together. Touches may also be grouped according to touch characteristics. For example, touches of similar size and/or shape are grouped together. Since intentional fingertip and stylus touches are typically circular and small, all circular touches with a diameter below a threshold may be grouped. In some embodiments, touches are grouped according to combinations of touch events. For example, groups are formed such that each group includes a fingertip and a palm touch. As indicated by the previous examples, groups may be formed according to combinations of criteria. For example, dorsal touches and palm touches near a stylus or fingertip touch are grouped together. In another example, dorsal touches near a palm touch are grouped together. These examples are further described with reference to FIGS. 20-22.

In some embodiments, contextual information is provided to the system. Context information may include a list of touch events a user may perform while interacting with the surface. In some embodiments, context information provides a list of touch events known by an application running on the touch system. Context information may also provide the type, size, and orientation of the touch system. For example, context information provides typical hand gestures that a user may perform when interacting with the touch surface. Thus, touch types and touch groups may be determined based on the typical hand gestures. For example, a palm touch may be shaped differently when a user is writing with a stylus compared to typing on a keyboard.

VI. Classification of Touches and Touch Groups

After an activity map is formed, touches can be classified as wanted or unwanted based on several methods. While the following methods are described in the context of an optical touch-sensitive system, these methods are not limited to being performed by an optical touch system (e.g., a capacitive touch system may use these methods to determine wanted and unwanted touch events). These methods can be performed individually or in combination. For example, a second method is performed to validate results from a first method. In another example, a first method is effective at classifying a first set of touch events and a second method is effective at classifying a second set of touch events.

While the following methods are explained in contexts where fingertip, stylus, dorsal, and palm touches are common, the methods are not limited to these touch types. Other touch types such as object touch types can also be classified. For example, these methods may be useful for identifying shapes in an educational application, such as recognizing a triangle as distinct from a square, or differentiating between an equilateral triangle and an isosceles triangle.

A. Contextual Information

The general classification of touches as wanted or unwanted may be dependent on received system context information and the configurations of touches or gestures present at a given time. An unwanted touch in one context may be a wanted in another context. For example, a palm touch on the surface is an unwanted touch if the user is writing on the surface with a stylus, but the same palm touch may be a wanted touch if the touch is intended to erase on-screen graphics. In some embodiments, context information indicates the system or application only accepts touches with specific touch types or characteristics. Thus, any touches other than the specified types and characteristics may be classified as unwanted. For example, a heads-up display (HUD) only accepts single touch events that are generally circular in shape. As a result, multiple touches and touches with noncircular shapes are classified as unwanted touch events. In some embodiments, context information includes user intent. For example, touch input may identify a desired user function (e.g., an erase function). Thus, unwanted touches can be determined based on the user intent. For example, if the system receives input indicating a user will perform typing gestures on a keypad, touches larger than a key on the keypad or between keys are classified as unwanted.

B. Machine Learning

Another approach to differentiating wanted and unwanted touches is to apply machine learning methods, such as support vector machines, random forest classifiers, or neural networks, to the activity map. Generally, there are two phases to such an approach:

The first phase is an a priori process of training a machine learning model using a population of data sets. Each data set A (e.g., an activity map, a set of templates, or a set of beam transmission values Tjk) is presented to the learning system along with an indication I as to whether the data set represents wanted touches, unwanted touches, neither, or both. Additionally or alternatively, the indication I includes touch types, touch characteristics, or touch groups that are present in the data set. The indication I may be provided by a human operator or an automated process. In an example automated process, the indication I is determined from additional sensors (e.g., an image capturing device) in a training touch system. In some embodiments, additional context input C is provided to the machine learning model during training.

In the second phase, the trained model is used to classify touches based on real-time data from a user interacting with the touch system. Depending on the training process, the model may classify individual touches or groups of touches as being wanted or unwanted. In some embodiments, the trained model classifies touch types (e.g., finger-dorsal) and subsequent processing determines whether a touch is wanted or unwanted. If the model is lacking sufficient data, such as context information, the model may classify one or more touches as "unknown."

C. Predefined Rules

Touches may also be classified as wanted or unwanted according to a predefined set of rules. Often these rules are based on touch types and touch characteristics and may further be based on contextual information. For example, in a writing application, only fingertip and stylus touches are classified as wanted touches. In these embodiments, all other touches may be grouped together and classified as unwanted touches. Additional or alternative rules for a writing application include a rule specifying that touches smaller than a threshold size are wanted touches and a rule specifying that in a given context sleeve and forearm touches are unwanted touches. In some embodiments, touches within a threshold distance of another touch are ignored. For example, if a touch object (other than a finger or a hand) is identified, finger touches near the touch object are classified as unwanted, presumably because a user's fingers are unintentionally disturbing beams while holding the touch object.

Supplementary information from beam analysis and template clustering may also be used to classify touches. Templates representing an entire touch event (instead of a cluster of templates) can also be applied to the beam data. The shape and size of a cluster of active templates representing a touch can be used as a first selection criterion for the potential touch templates to represent an entire touch event. The quality of the fit to the potential touch templates based on the beam transmission values Tjk can be used to determine the classification of the touch event. Thus, a touch which does not fit any template may be classified as an unintentional touch. For example, if a cluster of active templates form an oval shape, the beam values Tjk may be compared dorsal touch templates. If the set of beam values Tjk for the cluster match a dorsal template, the touch may be classified as a dorsal touch. Conversely, if no match is found (e.g., within a confidence or matching threshold) the touch may be classified as unwanted touch.

Figure 20:
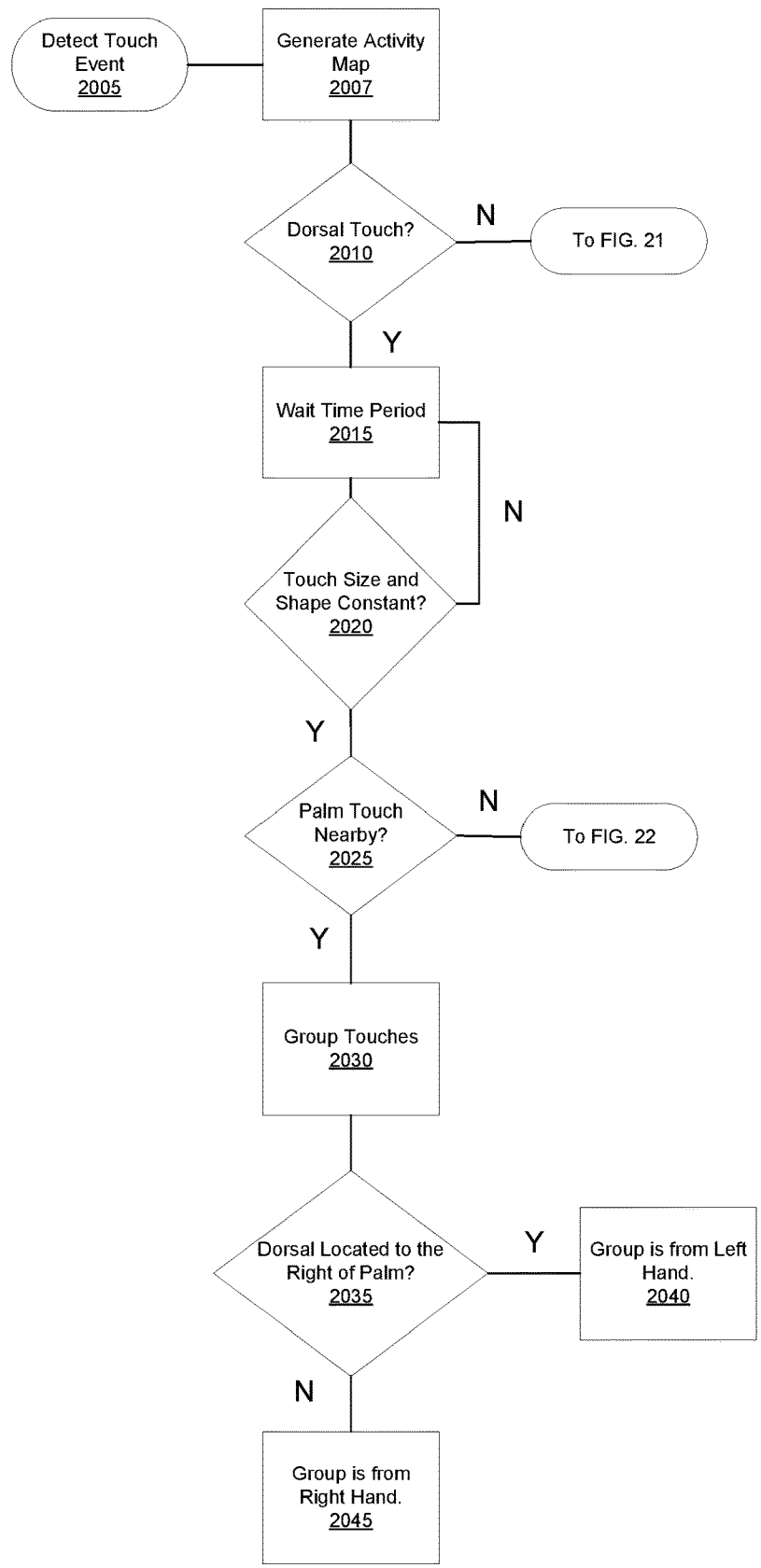
FIGS. 20-22 are flow charts illustrating a method for grouping and classifying touches, according to some embodiments.
Figure 21:
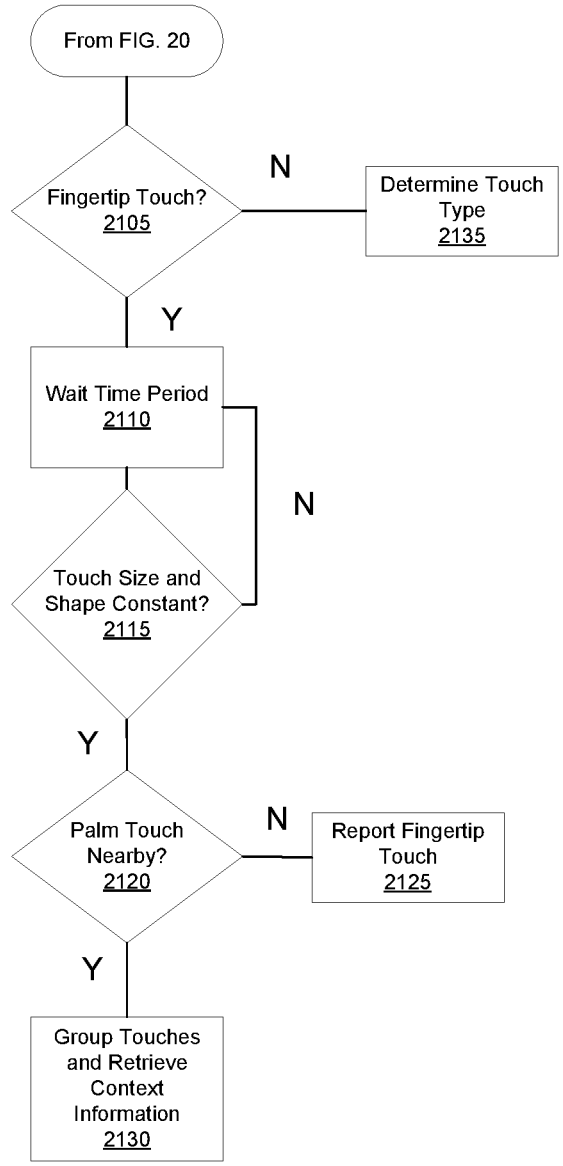
Figure 22:
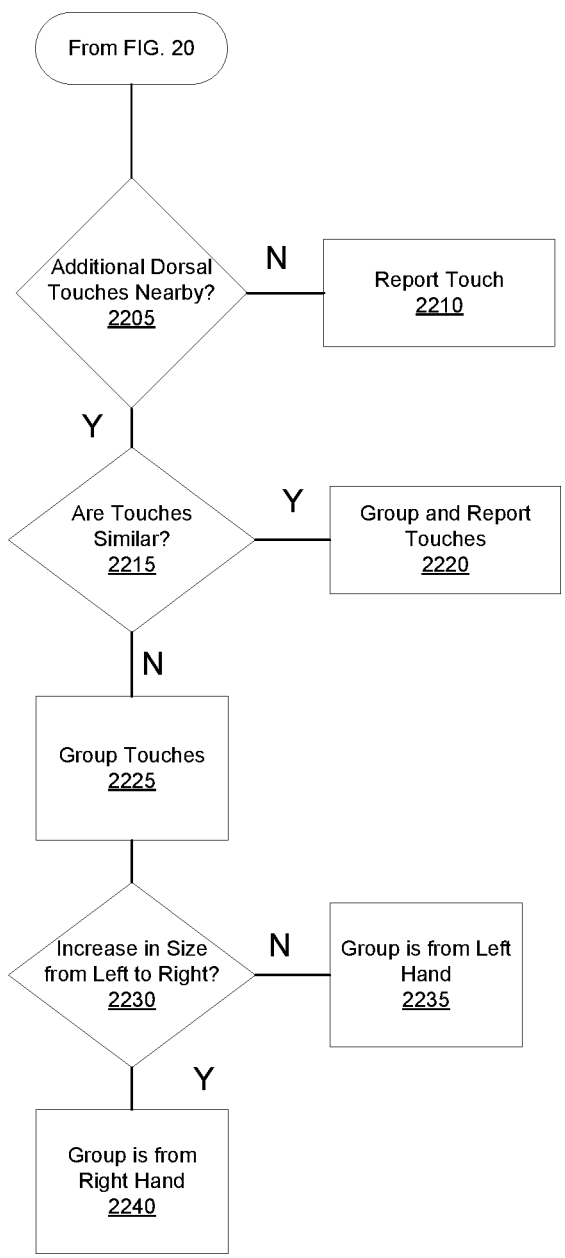

One or more rules may be combined to form a decision flowchart. An example flowchart is illustrated in FIGS. 20-22. FIGS. 20-22 are flow charts illustrating a method for classifying touches. The illustrated method was designed to address likely configurations of touches in a writing or drawing application and considers fingertip, dorsal, and palm touches. However, the method may be modified to consider different or additional touch types. The steps of the method may be performed in different orders, and the method may include different, additional, or fewer steps.

In the embodiment shown, the method begins with a touch system detecting 2005 one or more touch events. As previously described, in response to the touch events, an activity map is generated 2007. Using the activity map, the touch system determines whether the touch is a dorsal touch 2010. A dorsal touch is touch event caused by a dorsal side of a finger. A touch may be determined to be a dorsal touch based on its size and shape. Typically, dorsal touches are oval and smaller than palm touches yet larger than fingertip or stylus touches (e.g., touch 1720).

If the touch is determined to be a dorsal touch, the system waits 2015 a predetermined period of time. Afterwards, the system determines 2020 whether the touch size and shape are constant. If the touch event continues to change in size or shape, the system waits 2015 another predetermined period of time until the size and shape are constant. Waiting may confirm that the touch not a result of noise. Waiting may also confirm the touch is not a larger touch that has not made full contact with the surface yet (e.g., the touch initially appears to be a smaller touch until the object fully contacts the surface). Furthermore, if the size or shape of the touch changes larger than a predetermined threshold, the touch type of the touch may be re-determined.

If the size and shape of the touch is constant, the system determines 2025 whether a palm touch is nearby (e.g., within a threshold distance on the touch surface).

If a palm touch is nearby, the dorsal touch and the palm touch are grouped 2030 together. As a group, the touches may be considered a single touch. In some embodiments, if other dorsal touches are detected nearby (e.g., a threshold distance away from the first dorsal touch), the other dorsal touches are included in the group (e.g., group 1750 is formed). Depending on the context, since the group includes one or more dorsal touches and a palm touch, the group is considered an unwanted touch (unless the system is configured to respond to such an arrangement of touches).

The system determines 2035 if the dorsal touch is located to the right of the palm touch. If the dorsal touch is located to the right of the palm touch, the system determines 2040 that the group of touches is from a left hand. As described with reference to FIG. 17, a synthetic boundary may be defined around the group and new touches within the group and within a threshold distance from the can be classified as unwanted and a wanted touch (e.g., a touch from a fingertip or stylus) can be expected to the right of the touch group (if one is not already present). Similarly, if the dorsal touch is located to the left of the palm touch, the system determines 2045 the group of touches is from the right hand. Touches within a threshold distance from the group can be unwanted and a wanted touch can be expected to the left of the group. Referring to FIG. 17, if the group 1750 is determined, the device 100 expects wanted touch 1740 or, if touch 1740 is already present, the device 100 can quickly determine that touch 1740 is a wanted touch.

Referring to FIG. 21, if the touch is not a dorsal touch, it is determined 2105 whether the touch is fingertip touch. A touch can be determined to be a fingertip touch based on its size and shape. Typically, fingertip touches are circular and smaller than dorsal and palm touches (e.g., touch 1740).

If the touch is not a fingertip touch, it may be determined 2135 whether the touch is another touch type. If the touch is small, it may be a stylus or other instrument. Alternatively, the touch can be a contact which is above a maximum size threshold and, thus, is classified as being excessively large. If the touch is not identified as belonging to any known touch types, the touch can be classified as having an unknown type, and most probably deemed to be unwanted. As mentioned above, the touch may later be re-categorized as a known touch type once it has landed and stabilized (for these reasons, the classification of touches may be delayed for example on the order of tens of milliseconds).

Similar to steps 2015 and 2020, the device 100 waits 2010 a predetermined time period before determining 2115 whether the touch size and shape are constant. If the size and shape of the touch are constant, the system determines 2120 whether a palm touch (or a dorsal touch) is nearby (e.g., within a threshold distance on the touch surface).

If a palm touch is not nearby, the fingertip touch is classified as a wanted touch and the touch is reported 2125. In cases where intentional fingertip touches are common, the system may be designed such that fingertip touches pass through the method to step 2125 quickly compared to other method steps.

If a palm touch is nearby, the fingertip touch and the palm touch are grouped 2130 together. Depending on the context of the touches, the group may be a classified as wanted or an unwanted touch. Thus, if context information is not already known, context information may be retrieved to determine whether the group is a wanted or unwanted touch.

Referring to FIG. 22, if no palm touch is near the dorsal touch, it is determined 2205 whether additional dorsal touches are nearby.

If no additional dorsal touches are found, the dorsal touch is classified as a wanted touch and the touch is reported 2210. For example, the user is placing the dorsal side of their finger to perform a swiping gesture (e.g., to move an image or perform page turn function).

If additional dorsal touches are nearby, it is determined 2215 whether the additional dorsal touches are similar to the dorsal touch. Similarity may be based on touch characteristics. For example, if the additional dorsal touches have similar orientations and sizes (e.g., based on the long axes of the touch shapes), then the additional dorsal touches are classified as similar to the dorsal touch.

If the additional dorsal touches and the dorsal touch are similar, the touches are grouped 2220 together and reported. Depending on the system context, the group of touches may indicate that a hand is parallel to the touch surface and the dorsal side of several fingers are intentionally on touch the surface. For example, the hand is forming a gesture for moving an on-screen image.

If the additional dorsal touches and the first dorsal touch are not similar, the touches are also grouped together 2225. This can indicate that the dorsal side of several fingers are touching the surface but the hand is not parallel to the surface (e.g., touch 1530). For example, the hand is in a writing position on the touch surface. Thus, the group is classified as an unwanted touch.

After the dorsal touches are grouped together, it is determined 2230 whether the size of the dorsal touches increases from left to right. This may be based on the area of each touch or another shape parameter such as the length of the long axis of each touch. If the size of the dorsal touches increased from left to right, it is determined 2240 the group is from a right hand. If the size of the dorsal touches increases from right to left, it is determined 2235 the group is from a left hand. Similar to steps 2040 and 2145, a wanted touch on a writing side of the group may be expected and other touches within a threshold distance from the group can be classified as unwanted. In some embodiments, this process is generalized. If the dorsal touches are arranged such that sizes of the touches increase in size along a direction along the touch surface, a wanted touch is expected near the smallest dorsal touch along the direction, and other touches near the group may be categorized as unwanted touches and subsequently ignored.

VII. Distributed Processing

The processing methods described above may be applied in whole or in part through distributed processing processes, such as remotely located processing nodes. This may be advantageous since the complexity of touch formations supported by these methods are likely to be less commonly encountered than the typical groups of fingertip or stylus touches. For example, a touch sensing system in an educational environment might be tasked with recognizing geometric shapes presented to the sensing surface and indicating the detected shape to a student. This shape recognition can be done, for example, using trained machine learning systems in the cloud. Such a scheme can be extended to high levels of complexity, allowing formations of shapes at various orientations and scales to be recognized or interpreted by resources which need not be contained in the hardware directly associated with the system. In this way, the cost of the hardware can be reduced. By exposure to training data from a population of multiple touch systems, a remote learning system can be trained and improve its performance. Also, central administration of the touch analysis processing facilitates the addition of new touch types and formations to the remote system. New touch types can include geometric shapes, or special objects or instruments with distinctive optical properties such as those disclosed in U.S. Pat. No. 9,719,976.

Using a combination of local and remote processing systems may mean that latency delays may be small in response to frequently encountered (and locally processed) touches such as fingertips, while uncommon touch types or formations may be processed remotely. Remote processing is likely to incur additional latency, but that may be tolerable when the touch types or formations are uncommon. For example, the increased latency may be offset by an increase in processing power that is available remotely, reducing the overall processing time.

VIII. Changes of Classification

The determined touch characteristics (e.g., size and shape) of a touch may change over time. For example, the size of a touch event from a stylus decreases in size due the user applying less force to the stylus. Additionally, new touches may be detected near a given touch. As a result, the touch types of these touch events may be reclassified e.g., as long as the touches are detected. A touch type revision scheme can allow for the touch type to be changed. For example, if the type attributed to a touch is changed, the activity caused by the touch in its previous type can be revoked (e.g., undone), and the touch trajectory can be retraced with the new touch type.

In a case where a set of previously separate touches are revised to belong to a single touching object, the activity caused by the reported trajectories for the touches can be revoked and combined into a single trajectory. Then, the single touch trajectory (or a new recalculated trajectory which represents the motion of the touching object) can be retraced as the new touch type. Alternatively, the activity caused by the reported trajectories for the touches can be revoked, and all of those touches released. Then, a new touch can be generated with the new touch type, and the trajectory of one of the released touches (or a new recalculated trajectory which represents the motion of the touching object) can be traced by the new touch.

IX. Reducing Interference of Touch Events by Other Touch Events

In some cases, separate touches can interfere with one another, even if the touches are similar in size and optical absorption. For ex/ample, beams passing through a stylus touch can also pass through a larger nearby palm touch. As such the beam transmission values Tjk for the beams disturbed by the stylus touch may also be affected by the palm touch. This may disrupt the location estimate for the stylus touch.

In these cases, one or more interfering touches may be temporarily classified as unwanted touch events until a location (or other touch characteristics) of a touch event is determined. For example, if a palm touch is interfering with estimating a location of a stylus touch, the palm touch is considered an unwanted touch until the location of the stylus touch is determined (even if the palm touch is later determined to be a wanted touch).

An activity map may enable separate touches to be identified and the underlying beam data used to reduce interference interactions between touches. First, the touches as represented by clusters of active templates can be separated using image processing methods such as the recursive grassfire algorithm. Then, decomposing the templates for each touch into the underlying beams associated can provide a beam list for each touch. Finally, the beam list data can be used to reduce the disturbance between touches:

In some embodiments, this problem is solved by identifying beams for a touch that are not shared with any other touches. Thus, the identified beams may be used to determine the location and other touch characteristics of the touch. Using only the beams which are unique to a touch can eliminate or reduce the effects of other touches.

In other embodiments, the system may identify beams impacted by a touch event that are shared with other touches. For each shared beam, the system estimates the contribution of each touch to a change in transmission values Tjk caused by each of the touches along that beam. This estimation can be derived by applying a loss per unit distance rule and tracing the path length for each beam through each touch (for example by counting how many template regions the beam passes through in each touch). The loss per unit distance can be estimated by taking a percentile of the change in transmittance values Tjk for a population of the beams passing through a touch, or by identifying unshared beams (e.g., beams which are only affected by the touch in question) and dividing the transmission Tjk loss of those beams by their path length through the touch. Another way to estimate the contribution of each touch on the change in transmission on a shared beam is to identify unshared beams which should be affected by each touch in a same or similar manner as the shared beam. For example, a shared beam passing through the center of a circular touch should experience similar transmission Tjk loss from that touch as an unshared beam which also passes through the center of the touch (e.g., from a different direction).

When the effect of each touch on a shared beam has been apportioned to the touches, new beam values Tjk(1), Tjk(2) . . . Tjk(N) can be calculated for each beam, where the values are the transmission value for the beam segment passing through touches 1 to N. Thus, these calculated transmission values Tjk(x) for shared beams can be combined with the measured transmission values Tjk for unshared beams, and used to determine the location (and other touch characteristics) of a touch.

X. Example Methods

Figure 23:
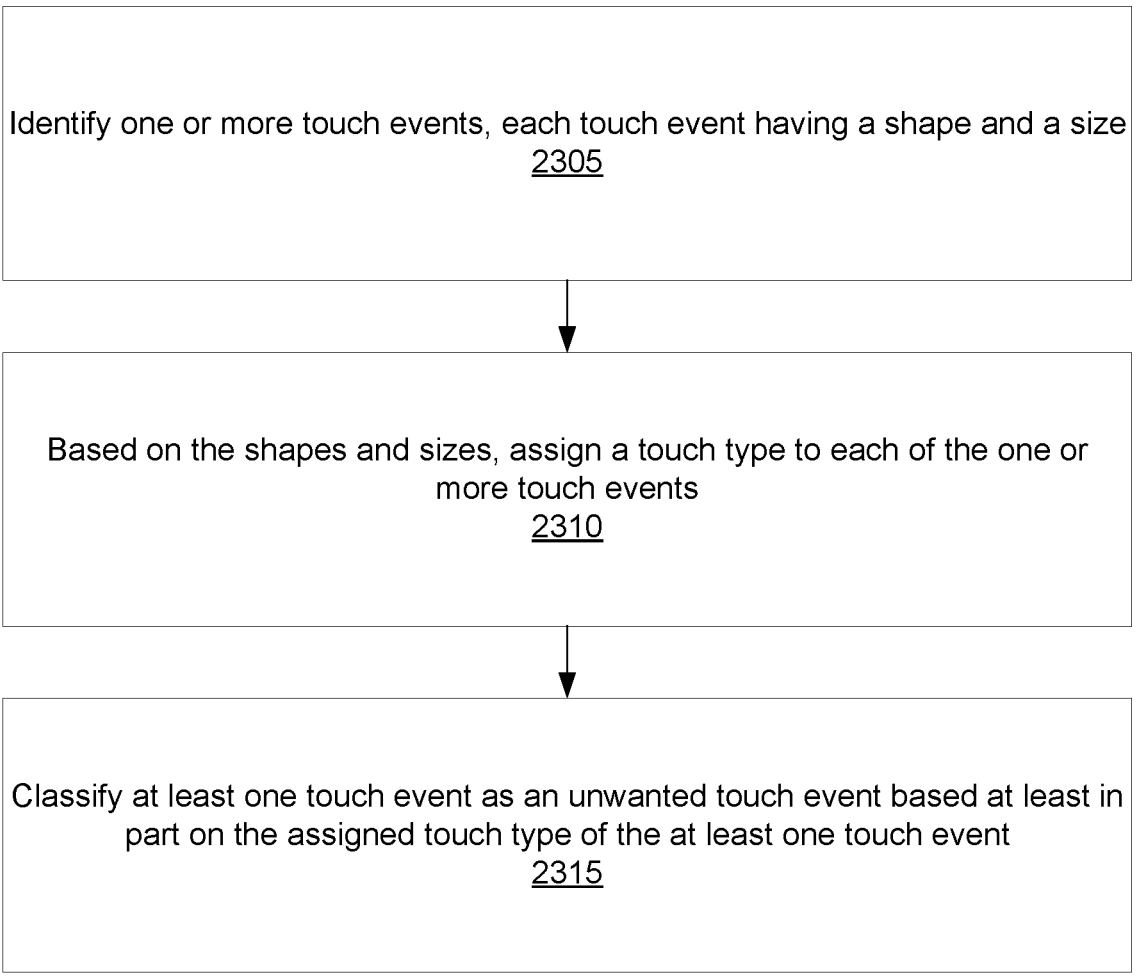
FIG. 23 is a flow chart illustrating a method for classifying unwanted touch events, according to an embodiment.

FIG. 23 is a flow chart illustrating a method for classifying touches, according to an embodiment. The steps of the method may be performed in different orders, and the method may include different, additional, or fewer steps.

One or more touch events are identified 2305. Each touch event has a shape and a size.

Based on the shapes and sizes, a touch type is assigned 2310 to each of the one or more touch events. Touch types may include a fingertip touch type, a stylus touch type, and a palm touch type. Assigning touch types may be performed by a machine learned model trained from data sets. Each data set includes information indicated a multiple touch events and labels classifying touch events as fingertips touches, stylus touches, and palm touches.

At least one touch event is classified 2315 as an unwanted touch event based at least in part on the assigned touch type of the at least one touch event. Touch events assigned as palm touch types may be classified as unwanted touch events. Classifying at least one group as a group of unwanted touch events may be performed by a machine learned model trained from data sets. Each data set includes information indicating multiple touch events and labels classifying touch events as wanted touches and unwanted touches.

In some embodiments, touch types further include a stylus touch type, a dorsal touch type, a forearm touch type, and a sleeve touch type. In these embodiments, classifying at least one touch event as an unwanted touch event includes classifying touch events assigned as dorsal touch types and sleeve touch types as unwanted touch events.

The method may include receiving context information including a list of touch types that can be classified as wanted. In these embodiments, classifying at least one touch event as an unwanted touch event is further based at least in part on the context information.

The method may include grouping the one or more touch events into groups. The grouping is based on the assigned touch types. In these embodiments, classifying at least one touch event as an unwanted touch event is further based at least in part on the grouping.

Figure 24:
FIG. 24 is a flow chart illustrating another method for classifying unwanted touch events, according to an embodiment.
Figure 24:

FIG. 24 is a flow chart illustrating another method for classifying touches, according to an embodiment. The steps of the method may be performed in different orders, and the method may include different, additional, or fewer steps.

One or more touch events are identified 2405. Each touch event has a location and a shape. Subsequent to identifying one or more touch events, one or more of the touch events may be classified as a fingertip touch event, a stylus touch event, a dorsal touch event, or a palm touch event based on the shapes of the touch events.

The one or more touch events are grouped 2410 into groups. The grouping is based on the locations and shapes of each of the one or more touch events. The grouping may also be based on sizes and orientations of each of the touch events. The grouping may be performed by a machine learned model trained from data sets. Each data set includes information indicated a plurality of touch events and labels classifying touch events as wanted touches or an unwanted touches.

At least one group is classified 2415 as a group of unwanted touch events based at least in part on the grouping. The group may be classifying may be performed by a machine learned model trained from data sets. Each data set includes information indicating a plurality of touch events and labels classifying touch events as a fingertip touches, stylus touches, dorsal touches, and palm touches. In some embodiments, the group of unwanted touch events includes a dorsal touch event and a palm touch event. In some embodiments, the group of unwanted touch events includes two or more dorsal touches.

FIG. 25 is a flow chart illustrating a method for forming a map of touch events one or near a surface, according to an embodiment. The surface has emitters and detectors arranges along at least a portion of its periphery. The emitters produce optical beams received by the detectors. Touch events disturb the optical beams. The steps of the method may be performed in different orders, and the method may include different, additional, or fewer steps.

A set of touch event templates are a priori determined 2505 for a group of expected touch events. Each touch event template represents a region of the surface and is defined by a corresponding set of at least two beams that would be disturbed by an expected touch event at the region.

Information indicating which beams have been disturbed by actual touch events is received 2510.

A subset of active templates is determined 2515 from the set of touch event templates. Each active template is a touch event template wherein the corresponding set of beams is disturbed by the actual touch events.

In some embodiments, determining the subset of active templates comprises additional steps. For each touch event template, beam transmission values for each beam in the corresponding set of beams are obtained. For each touch event template, it is determined whether at least a specified proportion of the transmission values exceed a predetermined threshold. For each touch event template, if the specified proportion exceed the predetermined threshold, the touch event template is included in the subset of active templates. In these embodiments, determining if the specified proportion exceeds the predetermined threshold comprises determining whether the specified proportion exceeds the predetermined threshold for a threshold amount of time.

An activity map is formed 2520 based on the subset of active templates, the activity map representing the actual touch events on or near the surface. The resolution of the activity map may be determined by a size of the regions represented by the touch event templates.

In some embodiments, the activity map is formed by clustering active templates into clusters based on the regions of the surface corresponding to the active templates. A first active template may be included in a cluster with a second active template if a first region of the surface corresponding to the first active template is no more than a threshold distance from a second region of the surface corresponding to the second active template.

XI. Applications

The touch-sensitive devices and methods described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

What is claimed is:

1. A method for forming an activity map of touch events on or near a surface, the surface having emitters and detectors arranged along at least a portion of its periphery, the emitters producing optical beams received by the detectors, touch events disturbing the optical beams, the method comprising:

determining, a priori, a set of touch event templates for a group of expected touch events, each touch event template representing a region of the surface and being defined by a corresponding set of at least two beams that would be disturbed by an expected touch event at the region;

receiving information indicating which beams have been disturbed by actual touch events;

determining a subset of active templates from the set of touch event templates, each active template being a touch event template wherein the corresponding set of beams is disturbed by the actual touch events; and forming the activity map based on the subset of active templates by clustering the active templates into clusters based on the regions of the surface corresponding to the active templates, wherein a first active template is included in a cluster with a second active template responsive to a first region of the surface corresponding to the first active template being no more than a threshold distance from another region of the surface corresponding to the second active template, a cluster of active templates representing an actual touch event of the actual touch events on or near the surface.

2. The method of claim 1, wherein a resolution of the activity map is determined by a size of the regions represented by the touch event templates.

3. The method of claim 1, wherein determining the subset of active templates comprises:

for each touch event template:
obtaining beam transmission values for each beam in the corresponding set of beams;
determining whether at least a specified proportion of the transmission values exceeds a predetermined threshold;
responsive to the specified proportion exceeding the predetermined threshold, including the touch event template in the subset of active templates.

4. The method of claim 3, wherein determining the specified proportion exceeds the predetermined threshold comprises determining whether the specified proportion exceed the predetermined threshold for a threshold amount of time.

5. The method of claim 1, further comprising:

identifying one or more touch events on or near the surface, each touch event having a shape and a size;
based on the shapes and sizes, assigning a touch type to each of the one or more touch events;
receiving context information for an application running on a touch system associated with the surface, the context information associated with the one or more touch events and including user intent associated with the application;
determining a list of touch types to be classified as wanted based on the context information; and
classifying at least one touch event as an unwanted touch event based at least in part on the list of touch types and the assigned touch type of the at least one touch event.

6. The method of claim 1, wherein the clusters of the activity map indicate a size, shape, and location of the actual touch events on or near the surface.

7. The method of claim 5, wherein classifying the at least one touch event as an unwanted touch comprises determining the assigned touch type is not in the list of touch types.

8. The method of claim 5, further comprising:

grouping the one or more touch events into one or more groups, the grouping based on the assigned touch types, wherein classifying at least one touch event as an unwanted touch event is further based at least in part on the grouping;

generating a boundary around a group that includes the unwanted touch event; and
classifying a new touch event within the boundary as an unwanted touch event.

9. The method of claim 5, wherein assigning a touch type to each of the one or more touch events is performed by a machine learned model, the machine learned model trained from data sets, each of the data sets including:

information indicating a plurality of touch events, and
labels classifying touch events as fingertip touches, stylus touches, and palm touches.

10. The method of claim 5, wherein classifying at least one group as a group of unwanted touch events is performed by a machine learned model, the machine learned model trained from data sets, each of the data sets including:

information indicating a plurality of touch events, and
labels classifying touch events as wanted touches and unwanted touches.

11. The method of claim 5, wherein classifying at least one touch event as an unwanted touch event comprises:

classifying touch events assigned as palm touch types as unwanted touch events.

12. The method of claim 1, further comprising:

identifying one or more touch events on or near the surface, each touch event having a location and a shape;
grouping the one or more touch events into one or more groups, the grouping based on the locations and shapes of each of the one or more touch events;
classifying at least one group as a group of unwanted touch events based at least in part on the grouping;
generating a boundary around the at least one group; and
classifying a new touch event within the boundary as an unwanted touch event.

13. The method of claim 12, wherein grouping the one or more touch events into groups and classifying at least one group as a group of unwanted touch events are performed by a machine learned model, the machine learned model trained from data sets, each of the data sets including:

information indicating a plurality of touch events, and
labels classifying touch events as wanted touches and unwanted touches.

14. The method of claim 12, further comprising, subsequent to identifying one or more touch events, classifying one or more of the touch events as a fingertip touch event, a stylus touch event, a dorsal touch event, or a palm touch event based on the shapes of the touch events.

15. The method of claim 14, wherein classifying one or more of the touch events as a dorsal touch event or a palm touch event is performed by a machine learned model, the machine learned model trained from data sets, each of the data sets including:

information indicating a plurality of touch events, and
labels classifying touch events as fingertip touches, stylus touches, dorsal touches, and palm touches.

16. A non-transitory computer-readable storage medium comprising stored instructions for forming an activity map of touch events on or near a surface, the surface having emitters and detectors arranged along at least a portion of its periphery, the emitters producing optical beams received by the detectors, touch events disturbing the optical beams, the stored instructions, when executed by computing device, cause the computing device to perform operations including:

determining, a priori, a set of touch event templates for a group of expected touch events, each touch event template representing a region of the surface and being defined by a corresponding set of at least two beams that would be disturbed by an expected touch event at the region;

receiving information indicating which beams have been disturbed by actual touch events;

determining a subset of active templates from the set of touch event templates, each active template being a touch event template wherein the corresponding set of beams is disturbed by the actual touch events; and forming the activity map based on the subset of active templates by clustering the active templates into clusters based on the regions of the surface corresponding to the active templates, wherein a first active template is included in a cluster with a second active template responsive to a first region of the surface corresponding to the first active template being no more than a threshold distance from another region of the surface corresponding to the second active template, a cluster of active templates representing an actual touch event of the actual touch events on or near the surface.

17. The non-transitory computer-readable storage medium of claim 16, wherein a resolution of the activity map is determined by a size of the regions represented by the touch event templates.

18. The non-transitory computer-readable storage medium of claim 16, wherein determining the subset of active templates comprises:

for each touch event template:
  obtaining beam transmission values for each beam in the corresponding set of beams;
  determining whether at least a specified proportion of the transmission values exceeds a predetermined threshold;
  responsive to the specified proportion exceeding the predetermined threshold, including the touch event template in the subset of active templates.

19. The non-transitory computer-readable storage medium of claim 18, wherein determining the specified proportion exceeds the predetermined threshold comprises determining whether the specified proportion exceed the predetermined threshold for a threshold amount of time.

20. The non-transitory computer-readable storage medium of claim 16, wherein the clusters of the activity map indicate a size, shape, and location of the actual touch events on or near the surface.

* * * * *